United States Patent
Janssen et al.

(10) Patent No.: US 9,795,924 B2
(45) Date of Patent: Oct. 24, 2017

(54) CENTRAL CORE ELEMENT FOR A SEPARATOR ASSEMBLY

(75) Inventors: Jonathan Sebastian Janssen, Clifton Park, NY (US); Philip Paul Beauchamp, Rexford, NY (US); Todd Alan Anderson, Niskayuna, NY (US); Mohammed Mounir Mahmoud Shalaby, Niskayuna, NY (US); Wenpeng Liu, Clifton Park, NY (US); Anubhav Kumar, Bangalore (IN)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 907 days.

(21) Appl. No.: 13/285,754

(22) Filed: Oct. 31, 2011

(65) Prior Publication Data

US 2013/0105023 A1  May 2, 2013

(51) Int. Cl.
*B01D 63/10* (2006.01)
*F16L 9/18* (2006.01)
(Continued)

(52) U.S. Cl.
CPC .......... *B01D 63/10* (2013.01); *B01D 63/103* (2013.01); *B29C 45/00* (2013.01); *B01D 61/025* (2013.01);
(Continued)

(58) Field of Classification Search
CPC .... B01D 61/025; B01D 63/10; B01D 63/103; B01D 2313/12; B01D 2313/125;
(Continued)

(56) References Cited

U.S. PATENT DOCUMENTS

| 3,397,790 A | 8/1968 | Newby et al. |
| 3,554,378 A | 1/1971 | Kohl |

(Continued)

FOREIGN PATENT DOCUMENTS

| AU | 16064 | 12/1971 |
| DE | 2055511 A1 | 6/1971 |

(Continued)

OTHER PUBLICATIONS

Veli Deniz, Nursel Karakaya, and Osman G. Ersoy; Effects of fillers on the properties of thermoplastic elastomers; Plastic Research online, Society of Plastics Engineers, Jan. 2010, pp. 1-4.*

*Primary Examiner* — Pranav Patel
(74) *Attorney, Agent, or Firm* — John P. Darling

(57) ABSTRACT

In one embodiment, the present invention provides a central core element for a reverse osmosis separator assembly, the central core element comprising a pair of central core element components, each of said core element components comprising at least one porous exhaust conduit and at least one friction coupling, the friction couplings being configured to join said core element components to form a central core element defining a cavity configured to accommodate a first portion of a membrane stack assembly; wherein each core element component comprises a first section defining an exhaust cavity and a second section comprising a porous exhaust conduit, wherein said porous exhaust conduit comprises a removable wall member configured to form a substantial portion of a porous exhaust conduit wall.

20 Claims, 23 Drawing Sheets

(51) Int. Cl.
   *B29C 45/00* (2006.01)
   *B01D 61/02* (2006.01)

(52) U.S. Cl.
   CPC ...... *B01D 2313/08* (2013.01); *B01D 2313/10* (2013.01); *B01D 2313/12* (2013.01)

(58) Field of Classification Search
   CPC .......... B01D 2313/10; B01D 2313/105; B01D 2313/08; B01D 2313/02; B01D 2313/025; B01D 65/003
   USPC .......... 210/137, 232, 321.6, 321.72, 321.73, 210/321.74, 321.78, 321.83, 486, 500.23
   See application file for complete search history.

(56) References Cited

U.S. PATENT DOCUMENTS

| | | | |
|---|---|---|---|
| 3,668,837 | A | 6/1972 | Gross |
| 3,933,646 | A | 1/1976 | Kanamaru et al. |
| 3,962,095 | A | 6/1976 | Luppi |
| 3,966,616 | A | 6/1976 | Bray |
| 4,083,780 | A | 4/1978 | Call |
| 4,229,305 | A * | 10/1980 | Fecondini et al. ....... 210/321.83 |
| 4,770,777 | A | 9/1988 | Steadly et al. |
| 4,834,881 | A | 5/1989 | Sawada et al. |
| 4,955,404 | A | 9/1990 | Pitzen |
| 4,973,408 | A | 11/1990 | Keefer |
| 5,034,126 | A | 7/1991 | Reddy et al. |
| 5,207,916 | A | 5/1993 | Goheen et al. |
| 5,470,469 | A | 11/1995 | Eckman |
| 5,494,573 | A | 2/1996 | Schoenmeyr et al. |
| 5,580,452 | A | 12/1996 | Lin |
| 5,733,602 | A | 3/1998 | Hirose et al. |
| 5,858,229 | A | 1/1999 | Uemura et al. |
| 6,368,507 | B1 | 4/2002 | Koo et al. |
| 7,063,789 | B2 | 6/2006 | Colby et al. |
| 8,021,550 | B2 | 9/2011 | Beauchamp et al. |
| 2008/0197069 | A1 | 8/2008 | Binkle et al. |
| 2010/0096308 | A1 | 4/2010 | Beauchamp et al. |
| 2010/0096309 | A1 | 4/2010 | Beauchamp et al. |
| 2010/0096319 | A1 | 4/2010 | Beauchamp et al. |

FOREIGN PATENT DOCUMENTS

| | | |
|---|---|---|
| DE | 20209511 U1 | 9/2002 |
| EP | 0383146 B1 | 12/1993 |
| GB | 1435985 | 5/1976 |
| JP | 06246125 A1 | 9/1994 |
| WO | WO9823361 A1 | 6/1998 |
| WO | WO200078436 A1 | 12/2000 |
| WO | WO2005070524 A1 | 8/2005 |

* cited by examiner

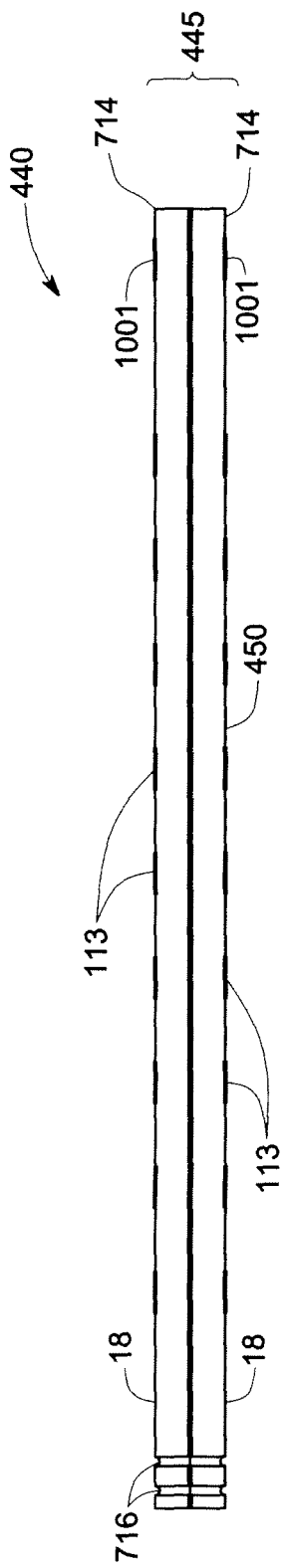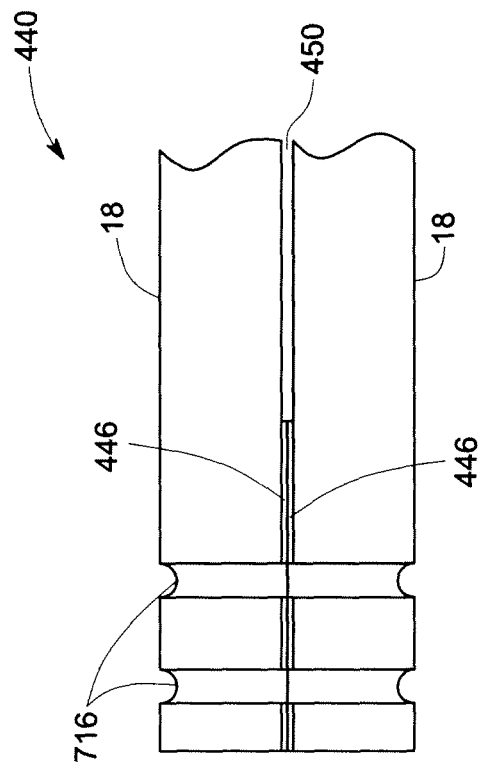
FIG. 11B
FIG. 11C

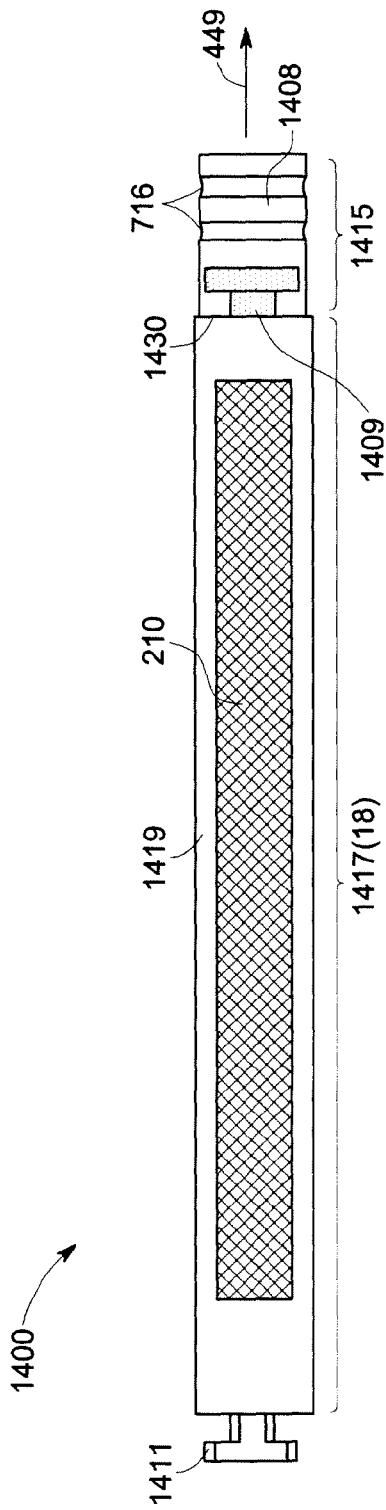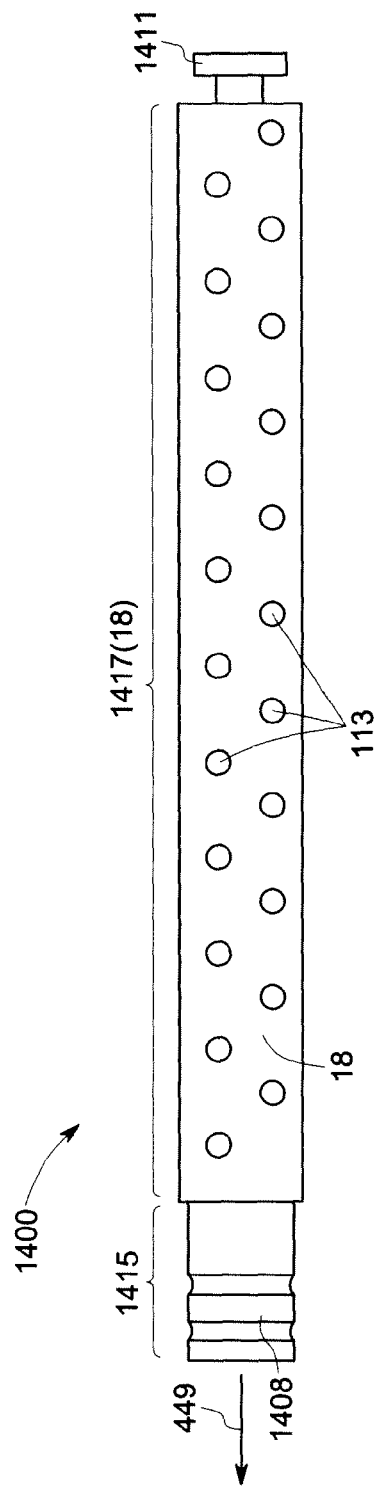
FIG. 17
FIG. 18

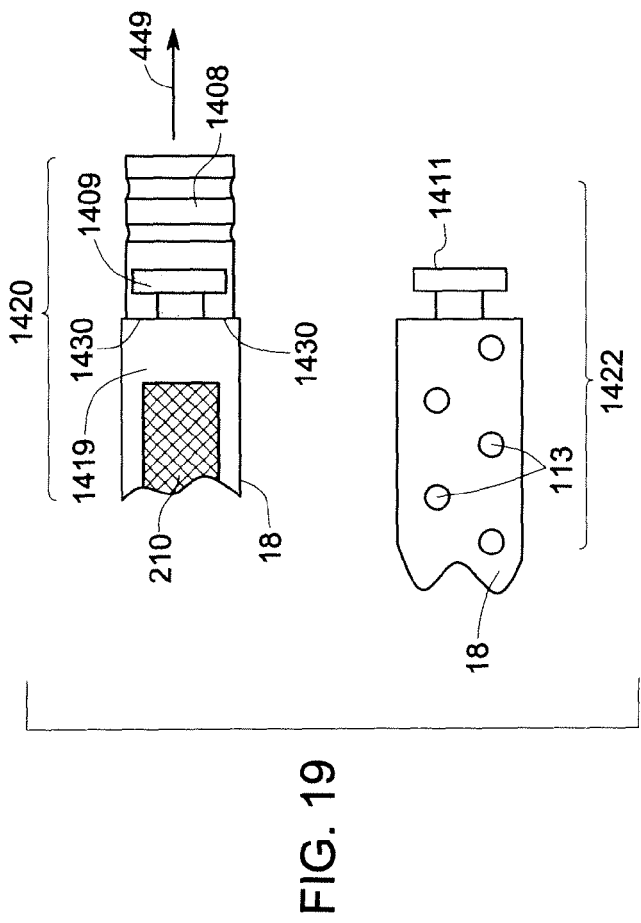
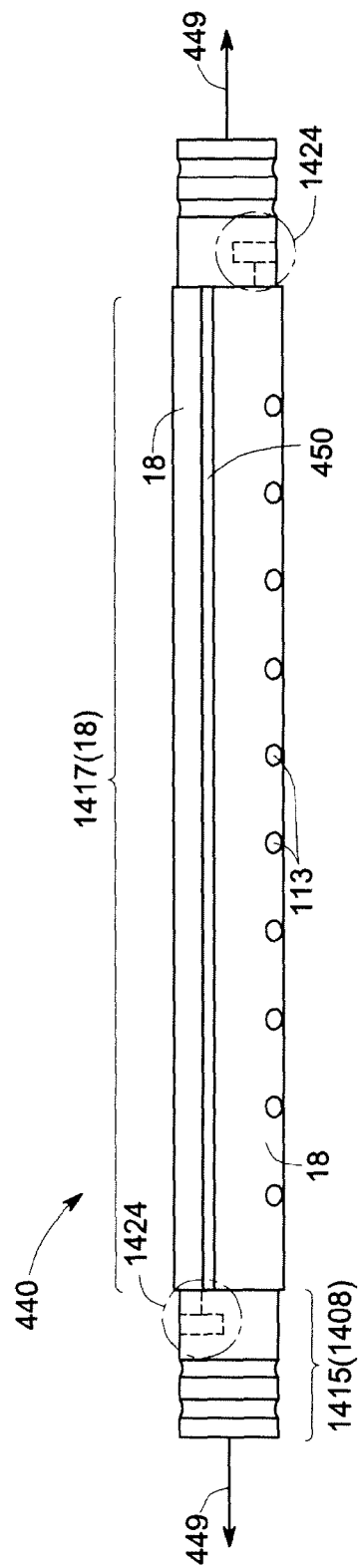

CENTRAL CORE ELEMENT FOR A SEPARATOR ASSEMBLY

BACKGROUND

This invention includes embodiments that generally relate to a central core element for separator assemblies. In various embodiments, the invention relates to central core elements for spiral flow separator assemblies. The invention also includes methods for making separator assemblies comprising the central core elements provided by the present invention.

Conventional separator assemblies typically comprise a folded multilayer membrane assembly disposed around a porous exhaust conduit. The folded multilayer membrane assembly comprises a feed carrier layer in fluid contact with the active-surface of a membrane layer having an active surface and a passive surface. The folded multilayer membrane assembly also comprises a permeate carrier layer in contact with the passive surface of the membrane layer and a porous exhaust conduit. The folded membrane layer structure ensures contact between the feed carrier layer and the membrane layer without bringing the feed carrier layer into contact with the permeate carrier layer or the porous exhaust conduit. During operation, a feed solution containing a solute is brought into contact with the feed carrier layer of the multilayer membrane assembly which transmits the feed solution to the active surface of the membrane layer which modifies and transmits a portion of the feed solution as a permeate to the permeate carrier layer. The feed solution also serves to disrupt solute accretion at the active surface of the membrane layer and transport excess solute out of the multilayer membrane assembly. The permeate passes via the permeate carrier layer into the porous exhaust conduit which collects the permeate. Separator assemblies comprising folded multilayer membrane assemblies have been used in various fluid purification processes, including reverse osmosis, ultrafiltration, and microfiltration processes.

Folded multilayer membrane assemblies may be manufactured by bringing the active surface of a membrane layer having an active surface and a passive surface into contact with both surfaces of a feed carrier layer, the membrane layer being folded to create a pocket-like structure which envelops the feed carrier layer. The passive surface of the membrane layer is brought into contact with one or more permeate carrier layers to produce a membrane stack assembly in which the folded membrane layer is disposed between the feed carrier layer and one or more permeate carrier layers. A plurality of such membrane stack assemblies, each in contact with at least one common permeate carrier layer, is then wound around a conventional porous exhaust conduit in contact with the common permeate carrier layer to provide the separator assembly comprising the multilayer membrane assembly and the porous exhaust conduit. The edges of the membrane stack assemblies are appropriately sealed to prevent direct contact of the feed solution with the permeate carrier layer. A serious weakness separator assemblies comprising a folded multilayer membrane assembly is that the folding of the membrane layer may result in loss of membrane function leading to uncontrolled contact between the feed solution and the permeate carrier layer.

Recently, significant advances have been made in membrane separator assemblies for the reverse osmosis purification of fluids. These advances have been based in part on new central core element designs in which the central core element is configured to accommodate a first portion of a membrane stack assembly within a cavity the dimensions of which are defined independently by the central core element itself and not by the dimensions of the membrane stack assembly, nor by a transient relationship of central core element components to a fixed reference such as a holding jig. A second portion of the membrane stack assembly is disposed around the central core element to provide a separator assembly containing no folds in membrane components. Notwithstanding the promise of these new central core elements, significant challenges to their efficient manufacture remain. Thus, for example, the flow channels of the recently disclosed central core elements are characterized by deep interior volumes, and as a result central core elements comprising such flow channels are difficult to manufacture by injection molding since the mold tool used to create the flow channel must be withdrawn from the flow channel during the molding process. Withdrawal of a mold tool from a flow channel is especially problematic when the flow channel is non-prismatic with the exit cavity to which the interior flow channel is typically joined. The long and relatively thin mold tool tends to stick to the walls of the flow channel and, given the relatively large surface area of the combined interior surfaces of a typical flow channel of a typical porous exhaust conduit; it becomes difficult to withdraw the mold tool from the flow channel without damaging the molded part. A second challenge to the manufacture of the recently disclosed central core elements and their components is the tendency of the central core element components to warp during cooling. Non-uniform cooling and warping can be especially problematic when different portions of the central core element component have different wall thicknesses. In certain instances, the walls of a porous exhaust conduit must have different thicknesses in order to balance basic geometric limitations against the dimensional strength of the porous exhaust conduit needed to be useful. Thus, there exists a need for further improvements in both the design and manufacture of central core elements for separator assemblies. Particularly in the realm of water purification for human consumption, there is a compelling need for more robust and reliable separator assemblies which are both efficient and cost effective.

BRIEF DESCRIPTION

In one embodiment, the present invention provides a central core element for a reverse osmosis separator assembly, the central core element comprising a pair of central core element components, each of said core element components comprising at least one porous exhaust conduit and at least one friction coupling, the friction couplings being configured to join said core element components to form a central core element defining a cavity configured to accommodate a first portion of a membrane stack assembly; wherein each core element component comprises a first section defining an exhaust cavity and a second section comprising a porous exhaust conduit, wherein said porous exhaust conduit comprises a removable wall member configured to form a substantial portion of a porous exhaust conduit wall.

In another embodiment, the present invention provides a central core element for a reverse osmosis separator assembly. The central core element comprises a pair of central core element components, each of said core element components comprising a porous exhaust conduit and two friction couplings, the friction couplings being configured to join said core element components to form a central core element defining a cavity configured to accommodate a first portion of a membrane stack assembly; wherein each core element component comprises a first section defining an exhaust cavity and a second section comprising a porous exhaust conduit, wherein said porous exhaust conduit comprises a removable wall member configured to form a substantial portion of a porous exhaust conduit wall.

In yet another embodiment, the present invention provides a central core element for a reverse osmosis separator assembly. The central core element comprises a pair of central core element components, each of the core element components comprised essentially of polyethylene, each of the central core element components comprising a porous exhaust conduit and two friction couplings, the friction couplings being configured to join said core element components to form a central core element defining a cavity configured to accommodate a first portion of a membrane stack assembly; wherein each core element component comprises a first section defining an exhaust cavity and a second section comprising a porous exhaust conduit, wherein said porous exhaust conduit comprises a removable wall member configured to form a substantial portion of a porous exhaust conduit wall.

These and other features, aspects, and advantages of the present invention may be understood more readily by reference to the following detailed description.

BRIEF DESCRIPTION OF THE DRAWINGS

The various features, aspects, and advantages of the present invention will become better understood when the following detailed description is read with reference to the accompanying drawings in which like characters may represent like parts throughout the drawings.

FIG. 11A, FIG. 11B and FIG. 11C illustrate a central core element in accordance with an embodiment of the present invention.

FIG. 17 illustrates a core element component in accordance with an embodiment of the invention.

FIG. 18 illustrates a core element component in accordance with an embodiment of the invention.

FIG. 19 illustrates core element components in accordance with an embodiment of the invention.

FIG. 20 illustrates a central core element in accordance with an embodiment of the invention.

DETAILED DESCRIPTION

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As noted, the present invention provides a central core element for a reverse osmosis separator assembly, the central core element comprising a pair of central core element components, each of said core element components comprising at least one porous exhaust conduit and at least one friction coupling, the friction couplings being configured to join said core element components to form a central core element defining a cavity configured to accommodate a first portion of a membrane stack assembly; wherein each core element component comprises a first section defining an exhaust cavity and a second section comprising a porous exhaust conduit, wherein said porous exhaust conduit comprises a removable wall member configured to form a substantial portion of a porous exhaust conduit wall.

Figure 21:
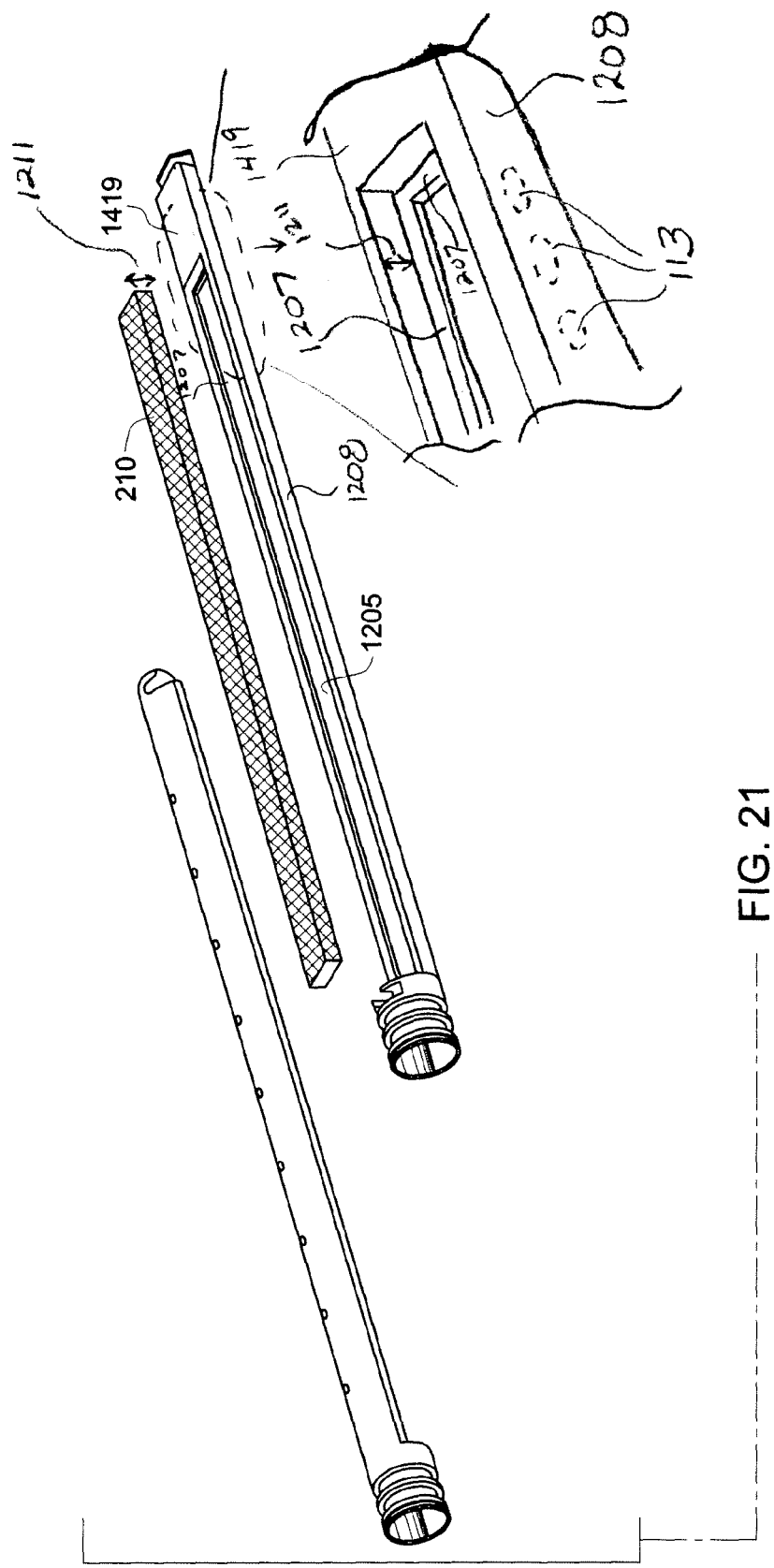
FIG. 21 illustrates a central core element in accordance with an embodiment of the invention.

In various embodiments of the present invention, for example as depicted in FIGS. 2A, 2B, 3, 4B, 5A, 5B, 5C, 7, 8, 9, 10, 11A, 12A, 13B, 14, 15, 16, 17, 19 and 21, the porous exhaust conduit comprises a removable wall member 210 configured to form a substantial portion of a porous exhaust conduit wall. By "a substantial portion" it is meant that the removable wall member comprises at least twenty percent of the mass of the porous exhaust conduit wall. In one embodiment, the removable wall member comprises at least forty percent of the mass of the porous exhaust conduit wall. In another embodiment, the removable wall member comprises at least sixty percent of the mass of the porous exhaust conduit wall. In yet another embodiment, the removable wall member comprises at least eighty percent of the mass of the porous exhaust conduit wall. In yet still another embodiment, the removable wall member comprises at least ninety-five percent of the mass of the porous exhaust conduit wall. A substantial portion of a porous exhaust conduit wall may also be considered in terms of the percentage of the total area of porous exhaust conduit wall represented by the removable wall member. Thus, in one embodiment, the removable wall member is configured to form a substantial portion of a porous exhaust conduit wall and comprises at least twenty percent of the surface area of the porous exhaust conduit wall. In another embodiment, the removable wall member is configured to form a substantial portion of a porous exhaust conduit wall and comprises at least forty percent of the surface area of the porous exhaust conduit wall. In yet another embodiment, the removable wall member is configured to form a substantial portion of a porous exhaust conduit wall and comprises at least sixty percent of the surface area of the porous exhaust conduit wall. In yet still another embodiment, the removable wall member is configured to form a substantial portion of a porous exhaust conduit wall and comprises at least eighty percent of the surface area of the porous exhaust conduit wall. In yet still another embodiment, the removable wall member is configured to form a substantial portion of a porous exhaust conduit wall and comprises at least ninety-five percent of the surface area of the porous exhaust conduit wall. The removable wall member together with the remainder of the porous exhaust conduit wall, form a surface of the central core element, for example an inner wall of the central core element configured to contact a first portion of a membrane stack assembly within a cavity defined by the central core element. The removable wall member is configured to fit within a cavity 1205 (FIG. 12 A and FIG. 21) defined by a portion of the inner wall of a central core element component. Typically the removable wall member 210 is prepared separately from the central core element component defining the cavity 1205 configured to accommodate the removable wall member. In one or more embodiments, the removable wall member is configured to fit snugly within the cavity, the edges of the removable wall member and the corresponding edges of the central core element component forming a friction joint between themselves. The removable wall member is considered "removable" in the sense that it does not initially form a part of the wall of the central core element component. In one or more embodiments the removable wall member may be inserted into the cavity defined by a portion of a wall of the central core element component and the central core element component so produced used in a separator assembly in which the removable wall member remains removable throughout the life of the separator assembly. For example, following the useful life of a separator assembly the multilayer membrane assembly may be unwound and the membrane stack assembly removed from the cavity (450) defined by the central core element. And thereafter, the removable wall member may be separated from the central core element component. This may be particularly advantageous when the removable wall member and the remainder of the central core element component comprise different materials which must be separated for recycling and reuse. Alternately, the removable wall member may be inserted into and permanently fixed within the cavity (1205) defined by a portion of a wall of the central core element component, for example by means of an adhesive or a weld joint. Typically, however, the removable wall member 210 remains permanently separable from a wall of the central core element component defining a porous exhaust conduit.

Typically the removable wall member 210 and the remainder of the central core element component comprise one or more thermoplastic materials. Suitable thermoplastic materials include, polyethylene, polypropylene, polybutylene, copolymers comprising polyethylene structural units (i.e. —$CH_2$—$CH_2$— units), copolymers comprising polypropylene structural units, copolymers comprising polybutylene structural units, polystyrene, copolymers comprising polystyrene structural units, polycarbonate (PC), bisphenol A polycarbonate (BPA-PC), polyesters (e.g. PET and PBT), polyvinyl chloride (PVC), ABS, polyetherimide (PEI), nylon, and polyetheretherkotone (PEEK). As noted, the removable wall member and the reminder of the central core element component may comprise the same or different materials. For example, the removable wall member may be comprised of polypropylene and the reminder of the central core element component may be comprised of polyethylene. In one embodiment, both the removable wall member and the remainder of the central core element component are comprised entirely of polyethylene. In another embodiment, both the removable wall member and the remainder of the central core element component are comprised entirely of polybutylene. In yet another embodiment, both the removable wall member and the remainder of the central core element component are comprised entirely of ABS thermoplastic. In another embodiment, the removable wall member 210 includes a thermoset material. In one embodiment, one or more of the removable wall member and the remainder of the central core element component comprises a filled thermoplastic material. Suitable fillers include, glass, inorganic oxide fillers such as alumina and silica, and clays filler materials.

Typically, both the removable wall member and the reminder of the central core element component are prepared by injection molding at temperatures in a range from about 100 to about 400° C. at pressures ranging from about 2 to about 10 tons per square inch. Those of ordinary skill in the art of injection molding and having read this disclosure will understand how to prepare the central core elements and their components provided by the present invention. Separately injection molding the removable wall member and the remainder of the central core element component confers a number of advantages relative to molding the corresponding central core element component as a unitary part. In one sense, the central core element design provided by the present invention is advantageous since separately molding the removable wall member and the reminder of the central core element reduces the total amount of material used to fill the mold and the complexity of the mold used to prepare the central core element component defining one or more cavities 1205 configured to accommodate one or more removable wall members 210. In addition, the central core element design provided by the present invention eliminates the need to mold structures defining large inner volumes such as the full length flow channel of a porous exhaust conduit of the central core element. Moreover, simplifying the mold employed in the preparation of the central core element component defining the cavity into which the removable wall member is configured to fit allows for greater part design latitude. For example, the central core element component defining the cavity into which the removable wall member is configured to fit may be prepared with additional features such as support rails (1207, FIG. 21) configured to support the removable wall 210 member when it is inserted into the cavity 1205 defined by the remainder of the central core element component. The central core element design provided by the present invention also provides enhancements in the manufacturability by injection molding of other important features such as friction couplings, openings in the porous exhaust conduit, blocking members, and exhaust cavities. In one embodiment, the removable wall member 210 is a single moldable unit. In another embodiment, a cavity defined by the central core element component and configured to accommodate a removable wall member is actually configured to accommodate a plurality of removable wall members, an example of this might be shown in FIG. 21 if removable wall member 210 were divided into two identical pieces at its midpoint. Typically, however, the removable wall member is a single moldable unit, and may be made by procedures known to those of ordinary skill in the art.

As noted, the core element component forming part of the central core element provided by the present invention includes an inner wall that comprises at least a portion of a porous exhaust conduit. In one embodiment, the inner wall (e.g. element 1419 shown in FIG. 21) of the porous exhaust conduit together with the friction couplings (1409 and 1411) and the first section (1415) of the central core element component define a cavity that is configured to accommodate a first portion of a membrane stack assembly when two such central core element components are joined together. Typically, the removable wall member 210 is a part of the structure of the inner wall 1419. In one or more embodiments, the removable wall member 210 is a detachable piece of the porous exhaust conduit. The removable wall member 210 my snap fit inside the inner wall of the porous exhaust conduit. In one embodiment, the removable wall member 210 may be rectangular in shape. In another embodiment, the removable wall member 210 may be oval in shape. Typically, each central core element component of a central core element provided by the present invention comprises at least one removable wall member. The removable wall member 210 may at each occurrence within a central core element have the same or different shapes. It is emphasized that the cavity defined within a wall of the central core element component configured to accommodate a removable wall member is different from the cavity defined by the central core element which is configured to accommodate a first portion of the membrane stack assembly. It may be useful to note at this point that the dimensions of the cavity configured to accommodate the removable wall member are determined by the dimensions of the removable wall member itself, whereas the dimensions of the cavity configured to accommodate a first portion of a membrane stack assembly may relate to geometric properties of the membrane stack assembly (e.g. a particular stack height and stack width) or other properties (e.g. stack compressibility, stack swelling properties, etc.).

As noted, non-uniform cooling and warping can be especially problematic when different portions of the central core element component have different wall thicknesses. In certain instances, however, the walls of a porous exhaust conduit must have different thicknesses in order to balance basic geometric limitations against the dimensional strength of the porous exhaust conduit needed to be useful. In one or more embodiments, the removable wall member and the porous exhaust conduit wall to which it is integral have the same thickness and that thickness is greater than the thickness of one or more adjacent walls of the porous exhaust conduit. For example, referring to FIG. 21 removable wall member 210 has thickness 1211 which greater than the thickness of porous exhaust conduit wall sections 1208.

It should be noted as well that the removable wall member may itself be porous and allow fluid communication between a membrane stack assembly layer disposed within the cavity configured to accommodate a first portion of the membrane stack assembly and the flow channel of a porous exhaust conduit. Thus, in one embodiment, removable wall member 210 defines openings 113 to conduct fluid from a permeate carrier layer into a permeate exhaust conduit.

A porous exhaust conduit of a reverse osmosis separator assembly comprising a membrane stack assembly may be a permeate exhaust conduit or a concentrate exhaust conduit depending on which layer or layers of the membrane stack assembly the porous exhaust conduit is in contact with. A layer is "in contact" with a porous exhaust conduit when the layer is configured to permit transfer of fluid from the layer into the conduit without passing through an intervening membrane layer. A permeate exhaust conduit is in contact with a permeate carrier layer surface (or in certain embodiments a membrane layer surface) in such a way that permeate may pass from the permeate carrier layer into the permeate exhaust conduit. A concentrate exhaust conduit must be in contact with a feed carrier layer surface in such a way that concentrate may pass from the feed carrier layer into the concentrate exhaust conduit. Each porous exhaust conduit is typically a porous tube running the length of the separator assembly, although other configurations may fall within the meaning of the term porous exhaust conduit, for example a longitudinally grooved structure, which structure may or may not be cylindrical, running the length of the separator assembly. Suitable porous tubes which may serve as the porous exhaust conduit of the central core element provided by the present invention include perforated metal tubes, perforated plastic tubes, perforated ceramic tubes and the like. In one embodiment, the porous exhaust conduit is not perforated but is sufficiently porous to allow passage of fluid from either the permeate carrier layer or the feed carrier layer into the interior of the porous exhaust conduit. Fluid passing from a permeate carrier layer into a porous exhaust conduit is at times herein referred to as "permeate" (or "the permeate") and the porous exhaust conduit is referred to as the permeate exhaust conduit. Fluid passing from a feed carrier layer into a porous exhaust conduit is at times herein referred to as "concentrate" (or "the concentrate", or simply "brine") and the porous exhaust conduit is referred to as the concentrate exhaust conduit. In one embodiment, the central core element comprises at least two porous exhaust conduits each of which is a porous half-cylinder shaped tube. In an alternate embodiment, the central core element comprises at least two porous exhaust conduits each of which is a porous half-octagon shaped tube. In another embodiment, the central core element comprises at least two porous exhaust conduits each of which is a porous half-decahedron shaped tube. In yet another embodiment, the central core element comprises at least two permeate exhaust conduits each of which is a porous half-tetradecahedron shaped tube. In one embodiment, the central core element comprises at least two porous exhaust conduits at least one of which is a porous teardrop shaped tube. The porous exhaust conduits may at each occurrence within a central core element have the same or different shapes. In one embodiment, the central core element comprises at least one porous exhaust conduit having a shape different from another porous exhaust conduit present in the same central core element. In another embodiment, all of the porous exhaust conduits present in a central core element have the same shape.

Figure 2A:
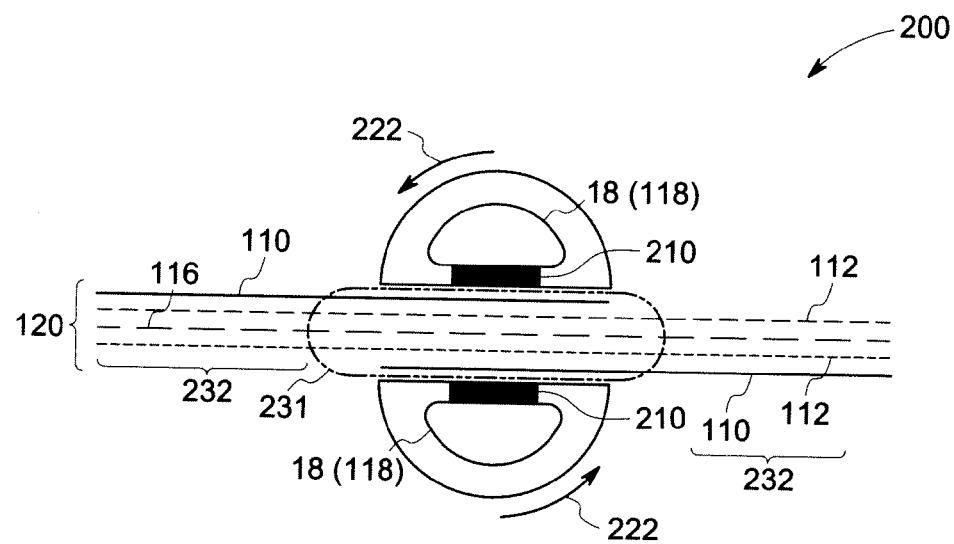
FIG. 2A and FIG. 2B illustrate a membrane stack assembly disposed within a central core element provided by the present invention.
Figure 2B:
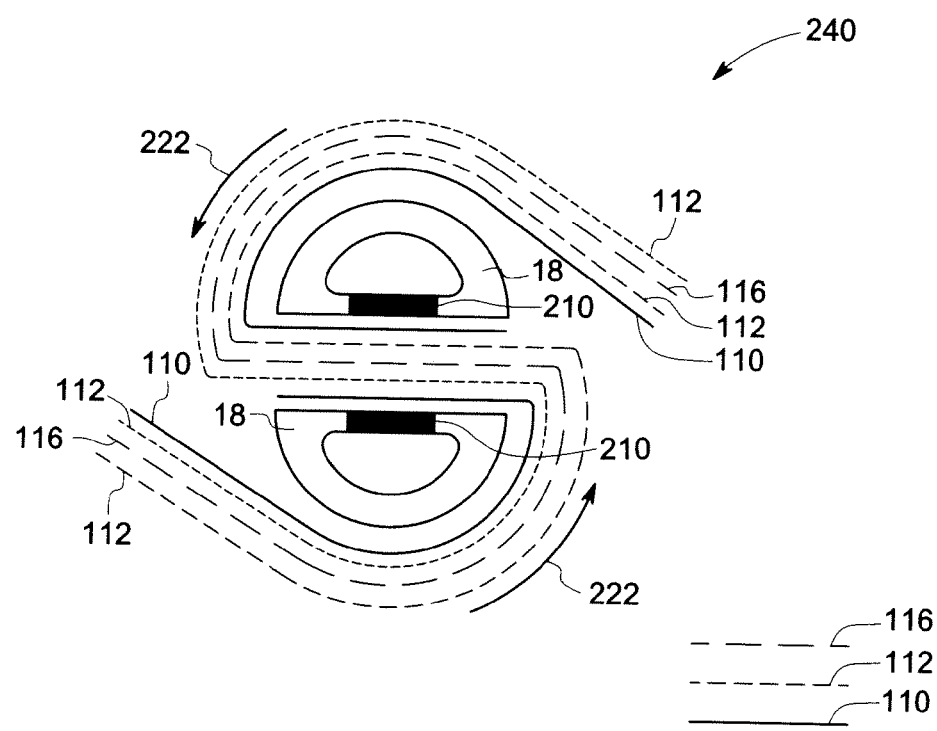

As used herein, the term "multilayer membrane assembly" refers to a second portion of a membrane stack assembly disposed around the central core element. FIG. 2A and FIG. 2B disclosed herein illustrate first and second portions (231 and 232) of the membrane stack assembly 120. In the embodiments shown in FIG. 2B and FIG. 3, the multilayer membrane assembly comprises the second portion 232 of the membrane stack assembly 120 disposed around the central core element. The multilayer membrane assembly comprises one feed carrier layer 116, two permeate carrier layers 110, and two membrane layers 112 disposed around the central core element comprising two porous exhaust conduits 18, which because they are in contact with permeate carrier layers 110 serve as permeate exhaust conduits. The separator assembly 300 depicted in FIG. 3 does not comprise a concentrate exhaust conduit.

Separator assemblies comprising a central core element provided by the present invention may be prepared by disposing a first portion 231 (FIG. 2A of a membrane stack assembly 120 (FIG. 2A) within a central core element provided by the present invention and then rotating the central core element, thereby winding a second portion 232 (FIG. 2A and FIG. 2B) of the membrane stack assembly around the central core element. As is disclosed in detail herein, the configuration of the membrane stack assembly and the disposing of the membrane stack assembly within the central core element are such that upon winding of the membrane stack assembly around the central core element to provide a wound structure and securing of the free ends of the membrane stack assembly after winding, a separator assembly comprising a multilayer membrane assembly disposed around the central core element provided by the present invention is obtained. Those skilled in the art will appreciate the close relationship, in certain instances, between the membrane stack assembly and the multilayer membrane assembly, and that the membrane stack assembly is the precursor of the multilayer membrane assembly. It is convenient to regard the membrane stack assembly as "unwound" and the multilayer membrane assembly as "wound". It should be emphasized, however, that as defined herein a multilayer membrane assembly is not limited to the "wound" form of one or more membrane stack assemblies disposed within a central core element, as other means of disposing the second portion of the membrane stack assembly around the central core element may become available. A separator assembly comprising a central core element provided by the present invention may comprise a multilayer membrane assembly comprising a second portion of one or more membrane stack assemblies radially disposed around the central core element such that the component membrane layers of the multilayer membrane assembly are free of folds or creases. In various embodiments, the separator assembly comprising the unique central core element provided by the present invention is characterized by a permeate carrier layer flow path length which is significantly shorter than the corresponding permeate carrier layer flow path length in a conventional separator assembly. The length of the permeate carrier layer flow path is an important factor affecting the magnitude of the pressure drop across the separator assembly. Thus, one of the many advantages provided by the present invention is greater latitude in the selection of useful operating conditions. As will become apparent to those of ordinary skill in the art after reading this disclosure, the present invention also offers significant advantages in terms of ease and cost of manufacture of separator assemblies generally.

As noted, the central core element provided by the present invention defines a cavity which is configured to accommodate a membrane stack assembly. The cavity is typically a cavity or gap between adjacent porous exhaust conduits. In one embodiment, the cavity is a transverse cavity defined around at least a portion of a central axis of rotation of the central core element. In one embodiment, the cavity is a transverse cavity defined by identical portions of two adjacent porous exhaust conduits. During the manufacture of a separator assembly comprising the central core element provided by the present invention, a first portion of a membrane stack assembly is disposed within the cavity defined by the central core element and a second portion of the same membrane stack assembly is wound around the central core element and constitutes a multilayer membrane assembly. Both the membrane stack assembly and the multilayer membrane assembly comprise at least one feed carrier layer. Materials suitable for use as the feed carrier layer include flexible sheet-like materials through which a feed solution may flow. In certain embodiments, the feed carrier layer is configured such that flow of a feed solution through the feed carrier layer occurs along the axis of the separator assembly from points on a first surface of the separator assembly (the "feed surface") where the feed carrier layer is in contact with the feed solution and terminating at a second surface of the separator assembly where a concentrate emerges (the "concentrate surface") from the feed carrier layer. The feed carrier layer may comprise structures which promote turbulent flow at the surface of the membrane layer in contact with the feed carrier layer as a means of preventing excessive solute build-up (accretion) at the membrane surface. In one embodiment, the feed carrier layer is comprised of a perforated plastic sheet. In another embodiment, the feed carrier layer is comprised of a perforated metal sheet. In yet another embodiment, the feed carrier layer comprises a porous composite material. In yet another embodiment, the feed carrier layer is a plastic fabric. In yet another embodiment, the feed carrier layer is a plastic screen. The feed carrier layer may be comprised of the same material as the permeate carrier layer or a material different from that used for the permeate carrier layer. In certain embodiments of separator assemblies comprising the central core element provided by the present invention, the feed carrier layer is not in contact with an exhaust conduit of the separator assembly.

In certain embodiments, the membrane stack assembly and the multilayer membrane assembly of a separator assembly comprising a central core element provided by the present invention comprise a single permeate carrier layer. In an alternate embodiment, the membrane stack assembly and the multilayer membrane assembly comprise at least two permeate carrier layers. Materials suitable for use as a permeate carrier layer include flexible sheet-like materials through which a permeate may flow. In various embodiments, the permeate carrier layer is configured such that during operation of a separator assembly comprising a central core element provided by the present invention, permeate flows in a spiral path along the permeate carrier layer to one of at least two permeate exhaust conduits. In one embodiment, the permeate carrier layer is comprised of a perforated plastic sheet. In another embodiment, the permeate carrier layer is comprised of a perforated metal sheet. In yet another embodiment, the permeate carrier layer comprises a porous composite. In yet another embodiment, the permeate carrier layer is a plastic fabric. In yet another embodiment, the permeate carrier layer is a plastic screen. In separator assemblies comprising multiple permeate carrier layers, the permeate carrier layers may be made of the same or different materials, for example one permeate carrier layer may be a plastic fabric while the another permeate carrier layer is a natural material such as wool fabric. In addition a single permeate carrier layer may comprise different materials at different locations along the permeate flow path through the permeate carrier layer. In one embodiment, for example, the present invention provides a central core element useful in a separator assembly comprising a permeate carrier layer, a portion of which permeate carrier layer is a polyethylene fabric, and another portion of which permeate carrier layer is polypropylene fabric.

In certain embodiments, the central core element provided by the present invention may be used in a separator assembly comprising a single membrane layer. In certain other embodiments, the central core element provided by the present invention may be used in a separator assembly comprising at least two membrane layers. Membranes and materials suitable for use as membrane layers are well-known in the art. U.S. Pat. No. 4,277,344, for example, discloses a semipermeable membrane prepared from the reaction of an aromatic polyamine with a polyacyl halide which has been found to be effective in reverse osmosis systems directed at rejecting sodium, magnesium and calcium cations, and chlorine, sulfate and carbonate anions. U.S. Pat. No. 4,277,344, for example, discloses a membrane prepared from the reaction of an aromatic polyacyl halide with a bifunctional aromatic amine to afford a polymeric material which has been found useful in the preparation of membrane layers effective in reverse osmosis systems directed at rejecting certain salts, such as nitrates. A host of technical references describing the preparation of various membranes and materials suitable for use as the membrane layer in separator assemblies comprising the central core element provided by the present invention are known to those of ordinary skill in the art. In addition, membranes suitable for use as the membrane layer in various embodiments of separator assemblies comprising the central core elements of the present invention are well known and widely available articles of commerce.

In one embodiment, at least one of the membrane layers comprises a functionalized surface and an unfunctionalized surface. In one embodiment, the functionalized surface of the membrane layer represents an active surface of the membrane and the unfunctionalized surface of the membrane layer represents a passive surface of the membrane. In an alternate embodiment, the functionalized surface of the membrane layer represents a passive surface of the membrane and the unfunctionalized surface of the membrane layer represents an active surface of the membrane. In various embodiments, the active surface of the membrane layer is typically in contact with the feed carrier layer and serves to prevent or retard the transmission of one or more solutes present in the feed solution across the membrane to the permeate carrier layer.

As used herein the phrase "not in contact" means not in "direct contact". For example, two layers of a membrane stack assembly, or a multilayer membrane assembly, are not in contact when there is an intervening layer between them despite the fact that the two layers are in fluid communication, since in general a fluid may pass from one layer to the other via the intervening layer. As used herein the phrase "in contact" means in "direct contact". For example, adjacent layers in the membrane stack assembly, or the multilayer membrane assembly, are said to be "in contact". Similarly a layer touching the surface of a porous exhaust conduit, as for example when a layer is wound around the exhaust conduit, is said to be "in contact" with the porous exhaust conduit provided that fluid may pass from the layer into the exhaust conduit. As a further illustration, a permeate carrier layer is said to be in contact with a permeate exhaust conduit when the permeate carrier layer is in direct contact with the permeate exhaust conduit, as for example when the permeate carrier layer is wound around the permeate exhaust conduit with no intervening layers between the surface of the permeate exhaust conduit and the permeate carrier layer. Similarly, a feed carrier layer is said to be not in contact with a permeate exhaust conduit, as when, for example, a permeate carrier layer is in direct contact with the permeate exhaust conduit and the permeate carrier layer is separated from the feed carrier layer by a membrane layer. In general, a feed carrier layer has no point of contact with a permeate exhaust conduit.

In one embodiment, the central core element provided by the present invention may be employed in a separator assembly in which a multilayer membrane assembly is radially disposed around the central core element. As used herein the phrase "radially disposed" means that a second portion of the membrane stack assembly comprising at least one feed carrier layer, at least one membrane layer, and at one permeate carrier layer is wound around a central core element comprising at least two porous exhaust conduits in a manner that limits the creation of folds or creases in the membrane layer. In general, the greater the extent to which a membrane layer is deformed by folding or creasing, the greater the likelihood of damage to the active surface of the membrane, loss of membrane function, and membrane integrity. Conventional separator assemblies comprising conventional central core elements typically comprise a highly folded multilayer membrane assembly comprising multiple folds in the membrane layer. Assuming the unfolded membrane layer represents a 180 degree straight angle, a highly folded membrane layer can be described as having a fold characterized by a reflex angle of greater than about 340 degrees. In one embodiment, the central core element provided by the present invention may be used to prepare a separator assembly containing no membrane layer folds characterized by a reflex angle greater than 340 degrees. In an alternate embodiment, the central core element provided by the present invention may be used to prepare a separator assembly containing no membrane layer folds characterized by a reflex angle greater than 300 degrees. In yet another embodiment, the central core element provided by the present invention may be used to prepare a separator assembly containing no membrane layer folds characterized by a reflex angle greater than 270 degrees.

In one embodiment, the central core element provided by the present invention may be used to prepare a salt separator assembly for separating salt from water, for example, seawater or brackish water. Typically, the separator assembly is contained within a cylindrical housing which permits initial contact between the feed solution and the feed carrier layer only at one surface of the separator assembly, at times referred to herein as the "feed surface". This is typically accomplished by securing the separator assembly within the cylindrical housing with, for example one or more gaskets, which prevent contact of the feed solution with surfaces of the separator assembly other than the feed surface. To illustrate this concept, the separator assembly can be thought of as a cylinder having a first surface and a second surface each having a surface area of $\pi r^2$, wherein "r" is the radius of the cylinder defined by the separator assembly, and a third surface having a surface area of $2\pi rh$ wherein "h" is the length of the cylinder. The separator assembly can by various means be made to fit snugly into a cylindrical housing such that a feed solution entering the cylindrical housing from one end encounters only the first surface (the "feed surface") of the separator assembly and does not contact the second or third surfaces of the separator assembly without passing through the separator assembly. Thus, the feed solution enters the separator assembly at points on the first surface of the separator assembly where the feed carrier layer is in contact with the feed solution, the edges of the membrane stack assembly being sealed to prevent contact and transmission of the feed solution from the first surface of separator assembly by the permeate carrier layer. In one embodiment, feed solution enters the separator assembly at the first surface of the separator assembly and travels along the length (axis) of the separator assembly during which passage, the feed solution is modified by its contact with the membrane layer through which a portion of the feed solution ("permeate" or "the permeate") passes and contacts the permeate carrier layer. The feed solution is said to flow axially through the separator assembly until it emerges as "concentrate" (also referred to at times as brine) at the second surface of the separator assembly, sometimes referred to herein as the "concentrate surface". This type of flow of feed solution through the separator assembly is at times herein referred to as "cross-flow", and the term "cross-flow" may be used interchangeably with the term "axial flow" when referring to the flow of feed solution. In an alternate embodiment, feed solution is introduced into the separator assembly through the third surface, in which case the third surface is referred to as the "feed surface". Typically, when a feed solution is introduced into the separator assembly through this "third surface" flow of feed solution through the feed carrier layer and flow of permeate through the permeate carrier layer occurs along a spiral path inward toward a concentrate exhaust conduit and a permeate exhaust conduit respectively. Those skilled in the art will appreciate that as a feed solution, for example seawater, travels from an initial point of contact between the feed solution with the feed carrier layer on the feed surface of the separator assembly toward a concentrate surface or a concentrate exhaust conduit, the concentration of salt present in the fluid in the feed carrier layer is increased through the action of the salt-rejecting membrane layer in contact with the feed solution passing through the feed carrier layer, and that the concentrate reaching the concentrate surface or the concentrate exhaust conduit will be characterized by a higher concentration of salt than the seawater used as the feed solution.

The roles and function of permeate exhaust conduits and permeate carrier layers may be illustrated using the salt separator assembly example above. Thus, in one embodiment, the separator assembly may be used as a salt separator assembly for separating salt from water. The feed solution, for example seawater, is contacted with the feed surface of a cylindrical separator assembly contained within a pressurizable housing. The separator assembly is configured such that a permeate carrier layer cannot transmit feed solution from the feed surface to a permeate exhaust conduit. As the feed solution passes through the feed carrier layer it contacts the salt-rejecting membrane layer which modifies and transmits a fluid comprising one or more components of the feed solution to the permeate carrier layer. This fluid transmitted by the salt-rejecting membrane layer, called permeate (or "the permeate"), passes along the permeate carrier layer until it reaches that portion of the permeate carrier layer in contact with the exterior of the permeate exhaust conduit, where the permeate is transmitted from the permeate carrier layer into the interior of the permeate exhaust conduit. Flow of permeate through the permeate carrier layer is referred to as "spiral flow" since the permeate tends to follow a spiral path defined by the permeate carrier layer toward the permeate exhaust conduit. Those skilled in the art will appreciate that as a feed solution, is modified and transmitted by the salt-rejecting membrane layer into the permeate carrier layer, the concentration of salt in the permeate is reduced relative to the feed solution due to the salt-rejecting action of the membrane layer.

In one embodiment, the central core element provided by the present invention is used in a separator assembly comprising a single permeate exhaust conduit and a single concentrate exhaust conduit. In an alternate embodiment, the central core element provided by the present invention is used in a separator assembly comprising at least two permeate exhaust conduits. In another embodiment, the central core element provided by the present invention is used in a separator assembly comprising at least two concentrate exhaust conduits. In one embodiment, the central core element provided by the present invention is used in a separator assembly comprising three or more porous exhaust conduits. In another embodiment, the central core element provided by the present invention is used in a separator assembly comprising from two to eight porous exhaust conduits. In yet another embodiment, the central core element provided by the present invention is used in a separator assembly comprising from 2 to 6 porous exhaust conduits. In still yet another embodiment, the central core element provided by the present invention is used in a separator assembly comprising from three to four porous exhaust conduits.

In one embodiment, the central core element provided by the present invention is used in a separator assembly comprising a single feed carrier layer. In an alternate embodiment, the central core element provided by the present invention is used in a separator assembly comprising a plurality of feed carrier layers. In one embodiment, the central core element provided by the present invention is used in a separator assembly wherein the number of feed carrier layers is in a range of from one layer to six layers. In another embodiment, the central core element provided by the present invention is used in a separator assembly wherein the number of feed carrier layers is in a range of from two layers to five layers. In still another embodiment, the central core element provided by the present invention is used in a separator assembly wherein the number of feed carrier layers is in a range of from three layers to four layers.

In one embodiment, the central core element provided by the present invention is used in a separator assembly comprising a single permeate carrier layer. In another embodiment, the central core element provided by the present invention is used in a separator assembly comprising at least two permeate carrier layers. In yet another embodiment, the central core element provided by the present invention is used in a separator assembly comprising from two to six permeate carrier layers. In yet another embodiment, the central core element provided by the present invention is used in a separator assembly comprising from two to five permeate carrier layers. In yet still another embodiment, the central core element provided by the present invention is used in a separator assembly comprising from three to four permeate carrier layers.

In one embodiment, the central core element provided by the present invention is used in a separator assembly comprising a single membrane layer. In an alternate embodiment, the central core element provided by the present invention is used in a separator assembly comprising at least two membrane layers. In one embodiment, the central core element provided by the present invention is used in a separator assembly comprising from two membrane layers to six membrane layers. In another embodiment, the central core element provided by the present invention is used in a separator assembly comprising from two membrane layers to five membrane layers. In still another embodiment, the central core element provided by the present invention is used in a separator assembly wherein the number of membrane layers is in a range of from three membrane layers to four membrane layers. The number of membrane layers may be directly proportional to the active surface area required to be provided by the separator assembly comprising the central core element of the present invention.

Figure 1:
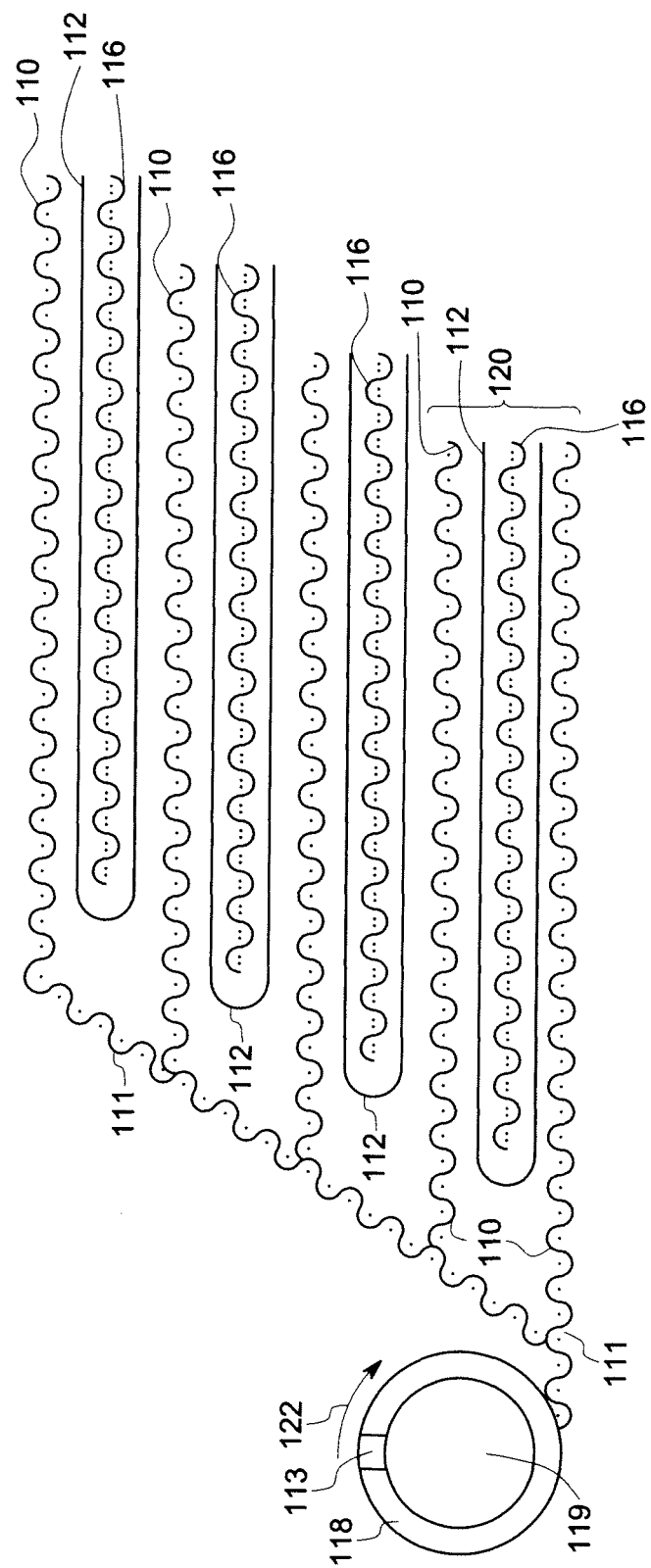
FIG. 1 illustrates the components of a conventional separator assembly and method of its assembly.

Referring to FIG. 1, the figure represents the components of and method of making a conventional separator assembly. A conventional membrane stack assembly 120 comprises a folded membrane layer 112 wherein a feed carrier layer 116 is sandwiched between the two halves of the folded membrane layer 112. The folded membrane layer 112 is disposed such that an active side (not shown in figure) of the folded membrane layer is in contact with the feed carrier layer 116. An active side of the membrane layer 112 is at times herein referred to as "the active surface" of the membrane layer. The folded membrane layer 112 is enveloped by permeate carrier layers 110 such that the passive side (not shown in figure) of the membrane layer 112 is in contact with the permeate carrier layers 110. A passive side of the membrane layer 112 is at times herein referred to as "the passive surface" of the membrane layer. Typically, an adhesive sealant (not shown) is used to isolate the feed carrier layer from the permeate carrier layer and prevent direct contact between a feed solution (not shown) and the permeate carrier layer. A plurality of membrane stack assemblies 120 wherein each of the permeate layers 110 is connected to a common permeate carrier layer 111 in contact with a conventional permeate exhaust conduit 118 is wound around the permeate exhaust conduit 118, for example by rotating the permeate exhaust conduit 118 in direction 122, and the resultant wound structure is appropriately sealed to provide a conventional separator assembly. The conventional permeate exhaust conduit 118 comprises openings 113 to permit fluid communication between the permeate exhaust conduit channel 119 and the common permeate carrier layer 111. As the membrane stack assemblies are wound around the permeate exhaust conduit 118, the reflex angle defined by the folded membrane layer 112 approaches 360 degrees.

Referring to FIG. 2A, the figure represents cross-section view at midpoint 200 of a first portion 231 of a membrane stack assembly 120 disposed within a central core element comprising two porous exhaust conduits 18 (also referred to as permeate exhaust conduits 118 since they are in direct contact with the permeate carrier layers 110), and a second portion 232 of the membrane stack assembly 120 disposed outside of the central core element. The first portion 231 of membrane stack assembly is disposed within a cavity defined by the porous exhaust conduits 18 (permeate exhaust conduits 118) of the central core element. The membrane stack assembly 120 illustrated in FIG. 2A and FIG. 2B comprises two permeate carrier layers 110, two membrane layers 112, and a single feed carrier layer 116. Rotation of the central core element comprising porous exhaust conduits 18 in direction 222 affords the partially wound structure 240 shown in FIG. 2B. Partially wound structure 240 is obtained by rotating the central core element of the assembly shown in FIG. 2A through a 180 degree rotation in direction 222. That portion (the second portion 232) of the membrane stack assembly 120 which is wound around the central core element becomes the multilayer membrane assembly of the completed separator assembly. The removable wall member 210 is disposed configured to form a substantial portion of a porous exhaust conduit wall 118. A separator assembly 300 (FIG. 3) is obtained by completely winding the second portion of the membrane stack assembly around the central core element and securing the ends of the membrane stack assembly. Note that in FIG. 3 the porous exhaust conduits are labeled as permeate exhaust conduits 118 since they are in direct contact with permeate carrier layers 110.

Figure 3:
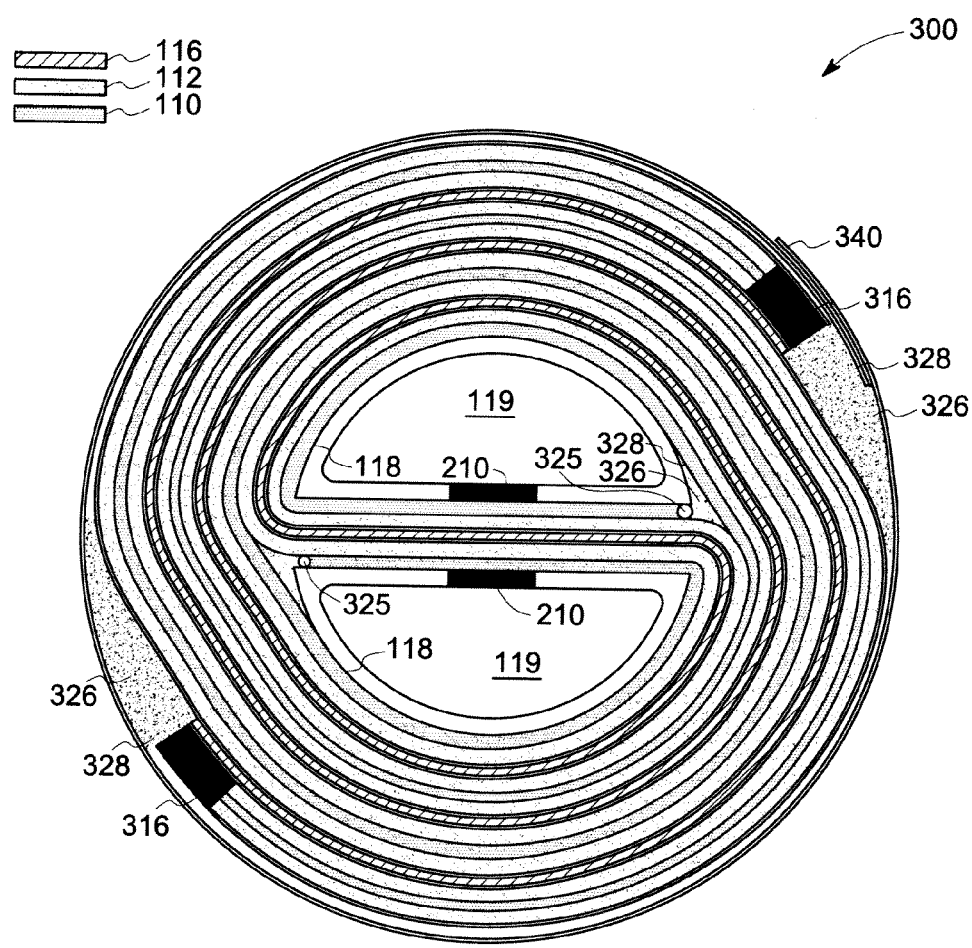
FIG. 3 illustrates a separator assembly comprising a central core element of the present invention.

Referring to FIG. 3, the figure represents a cross-section view at midpoint of a separator assembly 300 comprising a central core element provided by the present invention. Separator assembly 300 comprises a central core element comprising two permeate exhaust conduits 118, each permeate exhaust conduit 118 defining an interior channel 119 also at times herein referred to as exhaust channel 119. The central core element shown in FIG. 3 is shown as defining a cavity which accommodates a first portion of a membrane stack assembly 120 (FIG. 2A). The membrane stack assembly comprises one feed carrier layer 116, two permeate carrier layers 110, and two membrane layers 112, the membrane layers 112 being disposed between the feed carrier layer 116 and the permeate carrier layers 110. The permeate exhaust conduits 118 of the central core element are separated by a first portion 231 (FIG. 2A) of the membrane stack assembly 120 disposed within the cavity defined by the central core element, the cavity being configured to accommodate such first portion of the membrane stack assembly. A second portion 232 (FIG. 2A) of the membrane stack assembly forms a multilayer membrane assembly disposed around the central core element. FIG. 3 shows clearly that the feed carrier layer is not in contact with either of the permeate exhaust conduits or the permeate carrier layers. The ends of membrane stack assembly 120 are secured with sealing portion 316. Sealing portion 316 is a transverse line of sealant (typically a curable glue) which seals the outermost permeate carrier layer to the two adjacent membrane layers 112, said transverse line running the length of the separator assembly 300. The "third surface" of the separator assembly 300 illustrated in FIG. 3 is wrapped in tape 340. Also featured in the separator assembly 300 illustrated in FIG. 3 are transverse sealant lines 325 which secure the innermost ends of the permeate carrier layers 110 to the permeate exhaust conduits 118. Transmission of feed solution from the feed surface (See FIG. 4A) of the separator assembly 300 by either the permeate carrier layer or the membrane layer may be prevented by the presence of a sealant applied near the edge of the membrane layer and permeate carrier layer. Typically the sealant is applied to the passive surface of the membrane layer 112 which when contacted with the adjacent permeate carrier layer the sealant penetrates and seals the edge of permeate carrier layer. The sealant does not typically penetrate through the active surface of the membrane layer and thus does not come into contact with either the active surface (not shown) of the membrane layer 112 or the feed carrier layer 116. A variety of adhesive sealants, such as glues and/or double-sided tapes may be used to secure the ends of the multilayer membrane assembly to one another (sealing portion 316), the permeate carrier layers to the permeate exhaust conduits (transverse sealant line 325), and the edges of the membrane layers and permeate carrier layers to one another at the feed surface and the concentrate surface of the separator assembly (See FIG.

5B, Method Step 506, edge sealant element 526). Also featured in FIG. 3 are gaps 328 between the outer surface of the separator assembly 300 and outermost layer of the multilayer membrane assembly, and between the portions of the permeate exhaust conduits and the multilayer membrane assembly. It should be noted that the gaps illustrated in FIG. 3 are not present at all in various embodiments of the separator assemblies comprising the central core element provided by the present invention, and further that the size of gaps 328 shown in FIG. 3 has been exaggerated for the purposes of this discussion. Any gaps 328 present in a separator assembly may be eliminated by filling the gap with gap sealant 326. Gap sealants 326 include curable sealants, adhesive sealants, and the like.

Figure 4A:
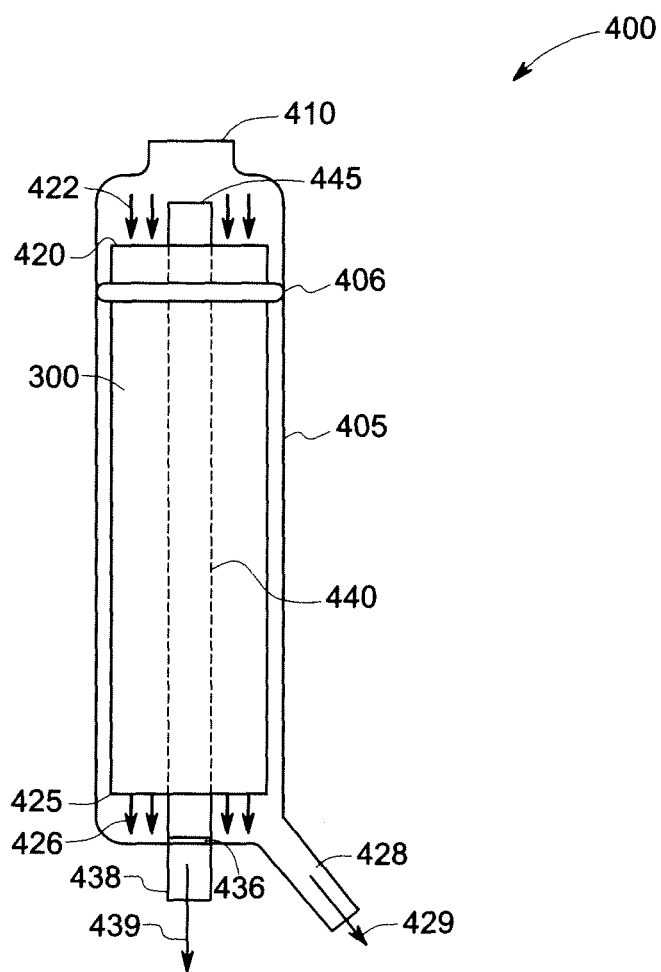
FIG. 4A and FIG. 4B illustrate a spiral flow reverse osmosis apparatus and a component central core element provided by the present invention.
Figure 4B:
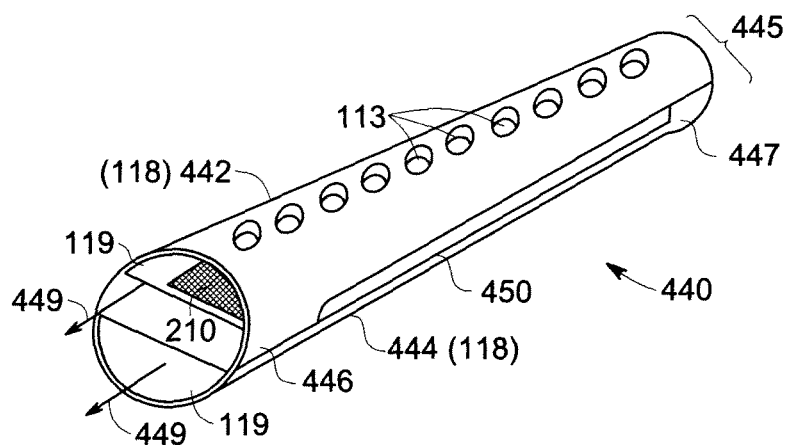

Referring to FIG. 4A, the figure represents side-on view of a spiral flow reverse osmosis apparatus 400 comprising the separator assembly 300 illustrated in FIG. 3 and comprising a central core element 440 provided by the present invention. The spiral flow reverse osmosis apparatus 400 comprises a separator assembly 300 secured by a gasket 406 within a pressurizable housing 405. Gasket 406 also prevents passage of feed solution through the apparatus 400 by means other than the interior of the separator assembly 300. The pressurizable housing 405 comprises a feed inlet 410 configured to provide a feed solution to the feed surface 420 (the "first surface") of the separator assembly 300. Numbered elements 422 represent the direction of flow of feed solution (not shown) into and through separator assembly 300 during operation. The pressurizable housing 405 comprises a permeate exhaust outlet 438 coupled via coupling member 436 to the permeate exhaust conduits 118 of central core element 440 of separator assembly 300. Direction arrow 439 indicates the direction of permeate flow during operation. Concentrate (not shown) emerges from the separator assembly at concentrate surface 425 in the direction indicated by direction arrows 426 and exits the pressurizable housing 405 via concentrate exhaust outlet 428, the concentrate flowing in direction 429 during operation. FIG. 4B shows perspective view of a central core element 440 provided by the present invention and present in separator assembly 300. In the embodiment illustrated in FIG. 4B central core element 440 is comprised of two half cylinder shaped tubes 442 and 444 serving as the permeate exhaust conduits 118 in separator assembly 300. At one end 445 of central core element 440, the permeate exhaust conduits are closed and at the opposite end the permeate exhaust conduits are open. (At various points in this disclosure, the closed end of a porous exhaust conduit is referenced as element 445.) Those skilled in the art will appreciate that the permeate exhaust conduits 442 and 444 have slightly different structures and are therefore given different numbers for the purposes of this discussion. Thus, permeate exhaust conduit 442 comprises a spacer element 446 at the open end of central core element 440, whereas permeate exhaust conduit 444 comprises a spacer element 447 at the closed end (445) of central core element 440. Spacer elements 446 and 447 define a cavity 450 which accommodates the first portion 231 of the membrane stack assembly 120 as shown in FIG. 2A. Each of permeate exhaust conduits 442 and 444 comprises openings 113 through which permeate may pass from the surface of the permeate exhaust conduit in contact with the permeate carrier layer into the interior 119 (the exhaust channel) of the permeate exhaust conduit. Because the permeate exhaust conduits of central core element 440 are blocked at end 445, flow of permeate through the permeate exhaust conduits is unidirectional in direction 449 when central core element is comprised within a separator assembly 300 used as shown in FIG. 4A. FIG. 4B also shows the removable wall member 210 as a rectangular wall section defining at least a portion of the cavity 450 configured to accommodate a first portion of the membrane stack assembly. In addition, removable wall member 210 defines a portion of the interior surface of the porous exhaust conduit (442).

Figure 5A:
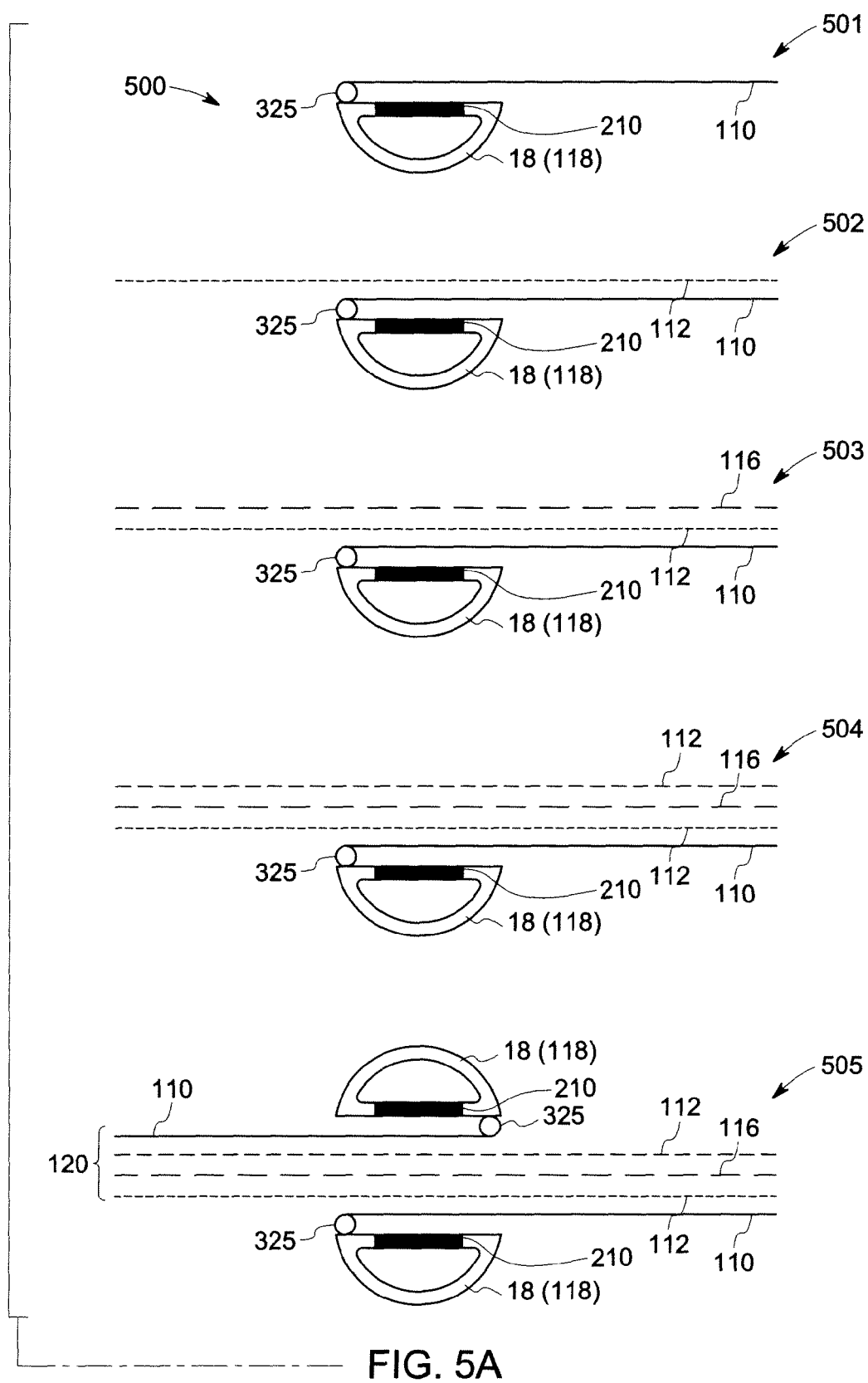
FIG. 5A, FIG. 5B and FIG. 5C illustrate a method of using a central core element provided by the present invention to make a separator assembly.
Figure 5B:
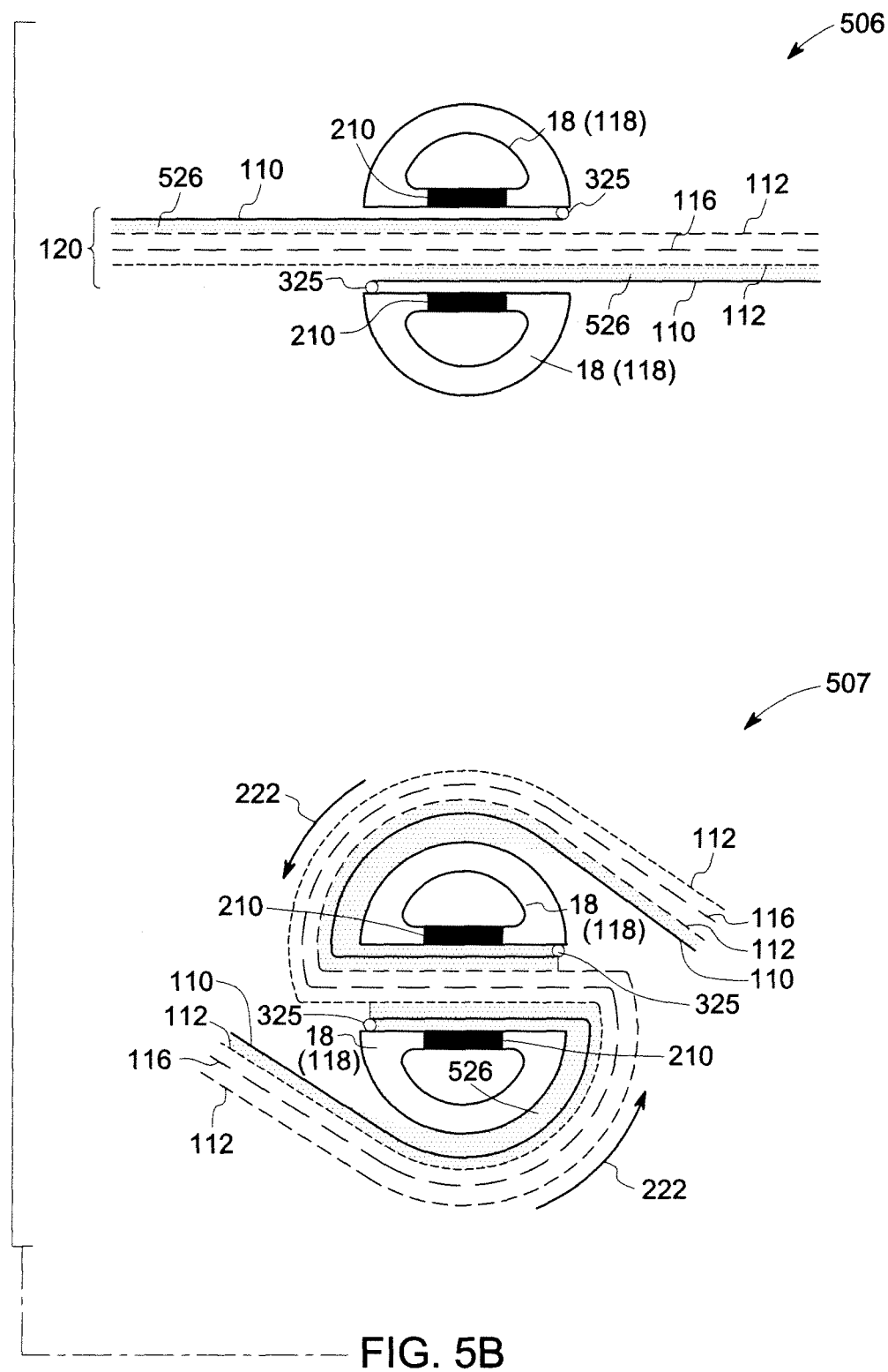
Figure 5C:
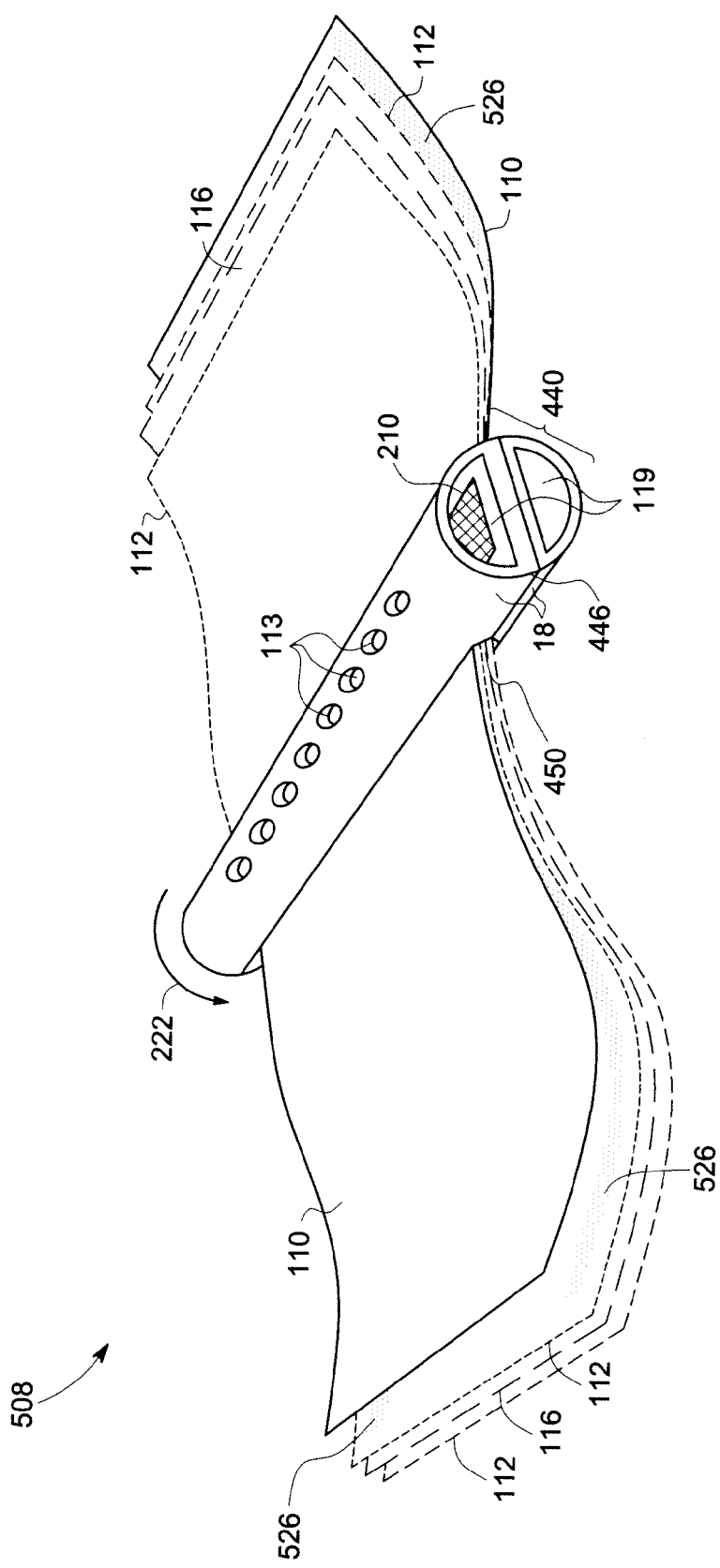

Referring to FIG. 5A and FIG. 5B, the figures illustrate a method 500 of using the central core element provided by the present invention for making the separator assembly 300 shown in FIG. 3. In a first method step 501, a first intermediate assembly is formed by providing a porous exhaust conduit 18 (118) and applying a bead of glue (not shown) along a line 325 running a length of the porous exhaust conduit and thereafter placing the permeate carrier layer 110 in contact with the uncured glue along line 325 and curing to provide the "first intermediate assembly" shown. Method step 501 is repeated to provide a second "first intermediate assembly" essentially identical to that shown in step 501. The portion of the porous exhaust conduit referred to as "a length of the porous exhaust conduit" corresponds to the width of the permeate carrier layer and to that portion of the porous exhaust conduit adapted for contact with the permeate carrier layer. As is apparent from this example and other parts of this disclosure, the length of the porous exhaust conduit is typically greater than the length of that portion of the porous exhaust conduit adapted for contact with the permeate carrier layer. And typically, the porous exhaust conduit is longer than the multilayer membrane assembly disposed around it in the separator assembly comprising the central core element provided by the present invention. That portion of the porous exhaust conduit adapted for contact with the permeate carrier layer is porous, for example by being provided with openings, for example those shown as elements 113 in FIG. 4B. That portion of the porous exhaust conduit not adapted for contact with the permeate carrier layer may not be porous except with respect to flow control elements for example baffles and openings such as elements 714 and 1001 featured in FIG. 7 and FIG. 10. The porous exhaust conduit further comprises the removable wall member 210 which is configured to form a substantial portion of the porous exhaust conduit and runs along a length of the porous exhaust conduit as shown in FIGS. 5A, 5B, and 5C. In certain embodiments of the present invention that portion of the porous exhaust conduit not adapted for contact with the permeate carrier layer is not porous.

In a second method step 502, a second intermediate assembly is prepared. A membrane layer 112 having an active surface (not shown) and a passive surface (not shown) is placed in contact with the first intermediate assembly of method step 501 such that the passive surface (not shown) of the membrane layer 112 is in contact with the permeate carrier layer 110. The membrane layer 112 is positioned such that it is bisected by, but not in contact with, porous exhaust conduit 18 (118).

In a third method step 503, a third intermediate assembly is formed. Thus a feed carrier layer 116 is applied to the second intermediate assembly shown in method step 502 such that the feed carrier layer is in contact with the active surface (not shown) of membrane layer 112 and is coextensive with it.

In a fourth method step 504, a fourth intermediate assembly is formed. Thus a second membrane layer 112 is added to the third intermediate assembly and placed in contact with feed carrier layer 116 such that the active surface (not shown) of the membrane layer is in contact with the feed carrier layer 116 and the second membrane layer is coextensive with the feed carrier layer.

In a fifth method step 505, a fifth intermediate assembly is formed. A first intermediate assembly as depicted in method step 501 is joined to the fourth intermediate assembly depicted in method step 504. The fifth intermediate assembly depicted in method step 505 features a membrane stack assembly 120 comprising one feed carrier layer disposed between two membrane layers 112, and two permeate carrier layers. The fifth intermediate assembly shown in method step 505 shows a first portion of membrane stack assembly 120 disposed within the cavity defined by the central core element comprising porous exhaust conduits 18 (118); and further shows a second portion of membrane stack assembly 120 disposed outside of the central core element.

In a sixth method step 506 an edge sealant 526 is applied as a longitudinal line along each edge of membrane layer 112 in contact with the permeate carrier layer to afford a sixth intermediate assembly. The edge sealant is applied to the passive surface (not shown) of the membrane layer. The edge sealant permeates the adjacent permeate carrier layer along the entire length of its edge.

In a seventh method step 507 the free portions of the sixth intermediate assembly (also referred to as the "second portion" of the membrane stack assembly) are wound around the central core element before curing of the edge sealant 526. Winding the second portion of the membrane stack assembly around the central core element is carried out while the edge sealant is in an uncured state to allow the surfaces of layers of the membrane stack assembly some freedom of motion during the winding process. In one embodiment, the edge sealant 526 is applied as part of the winding step. The structure shown in method step 507 (a seventh intermediate assembly) depicts the structure shown in method step 506 after rotating the central core element through 180 degrees. The preparation of separator assembly 300 may be completed by rotating the central core element in direction 222 thereby winding the second portion of the membrane stack assembly around the central core element to form a wound assembly, and then securing the ends of the membrane stack assembly. The ends of the membrane stack assembly present in the wound assembly may be secured by various means such as by wrapping the "third surface" of the cylinder defined by the separator assembly with tape, securing the ends of the membrane stack assembly with o-rings, applying a sealant to the ends of the membrane stack assembly, and like means. The wound second portion of the membrane stack assembly is referred to in this embodiment as the multilayer membrane assembly. This multilayer membrane assembly is said to be disposed around the central core element comprising porous exhaust conduits 18 (118). Curing of edge sealant 526, effectively seals the edges of the permeate carrier layer and membrane layer 112 at both the feed surface (surface 420 shown in FIG. 4a) and the concentrate surface (surface 425 shown in FIG. 4a) of the separator assembly, and blocks fluid transmission from the feed surface except by means of the feed carrier layer 116.

Referring to FIG. 5C, structure 508 presents a perspective view of a membrane stack assembly 120 disposed within a cavity defined by a central core element 440 provided by the present invention during the preparation of a separator assembly. The structure 508 corresponds to the sixth intermediate assembly shown in method step 506. A curable edge sealant 526 is shown as disposed along each longitudinal edge (there are a total of four such edges) on the passive surface of membrane layer 112 and in contact with permeate carrier layer 110. The central core element 440 is rotated in direction 222 to provide a wound structure. The free ends of the membrane stack assembly present in the wound structure are then secured by applying additional edge sealant 526 along the transverse edges (there are a total of two such edges) at the passive surface of the membrane layer. Central core element 440 comprises two porous exhaust conduits 18, each of which porous exhaust conduits comprises an exhaust channel 119. Each of the porous exhaust conduits 18 represents a half-cylinder shape tube. Spacer elements 446 and 447 (FIG. 4B) define a cavity 450 between the porous exhaust conduits 18. Openings 113 on each of the porous exhaust conduits allow fluid communication between the exterior surface of the porous exhaust conduit and the exhaust channel 119. As noted, central core element 440 defines a cavity 450 which is shown as accommodating a first portion of a membrane stack assembly 120 (See FIG. 5B).

Figure 6:
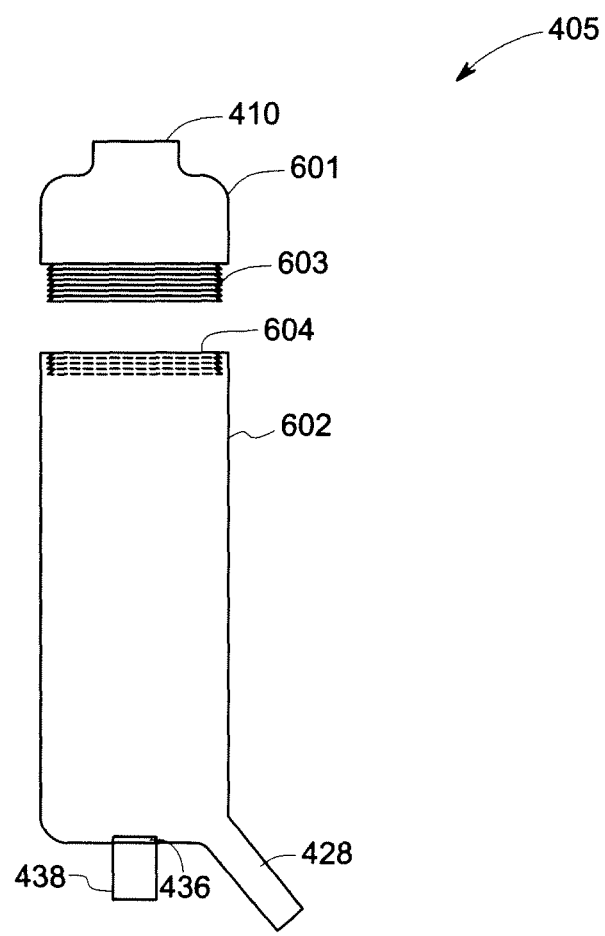
FIG. 6 illustrates a pressurizable housing which may be used in conjunction with a separator assembly comprising a central core element provided by the present invention.

Referring to FIG. 6, the figure represents a pressurizable housing 405 used in making the spiral flow reverse osmosis apparatus 400 shown in FIG. 4A comprising a central core element 440 provided by the present invention. Pressurizable housing 405 comprises a detachable first portion of pressurizable housing 601 and a detachable second portion of pressurizable housing 602. The first and second portions 601 and 602 may be joined by means of threads 603 for securing 601 to 602, and threads 604 which are complementary to threads 603. Other means of securing a detachable first portion of a pressurizable housing to a detachable second of a pressurizable housing include the use of snap together elements, gluing, taping, clamping and like means.

Figure 7:
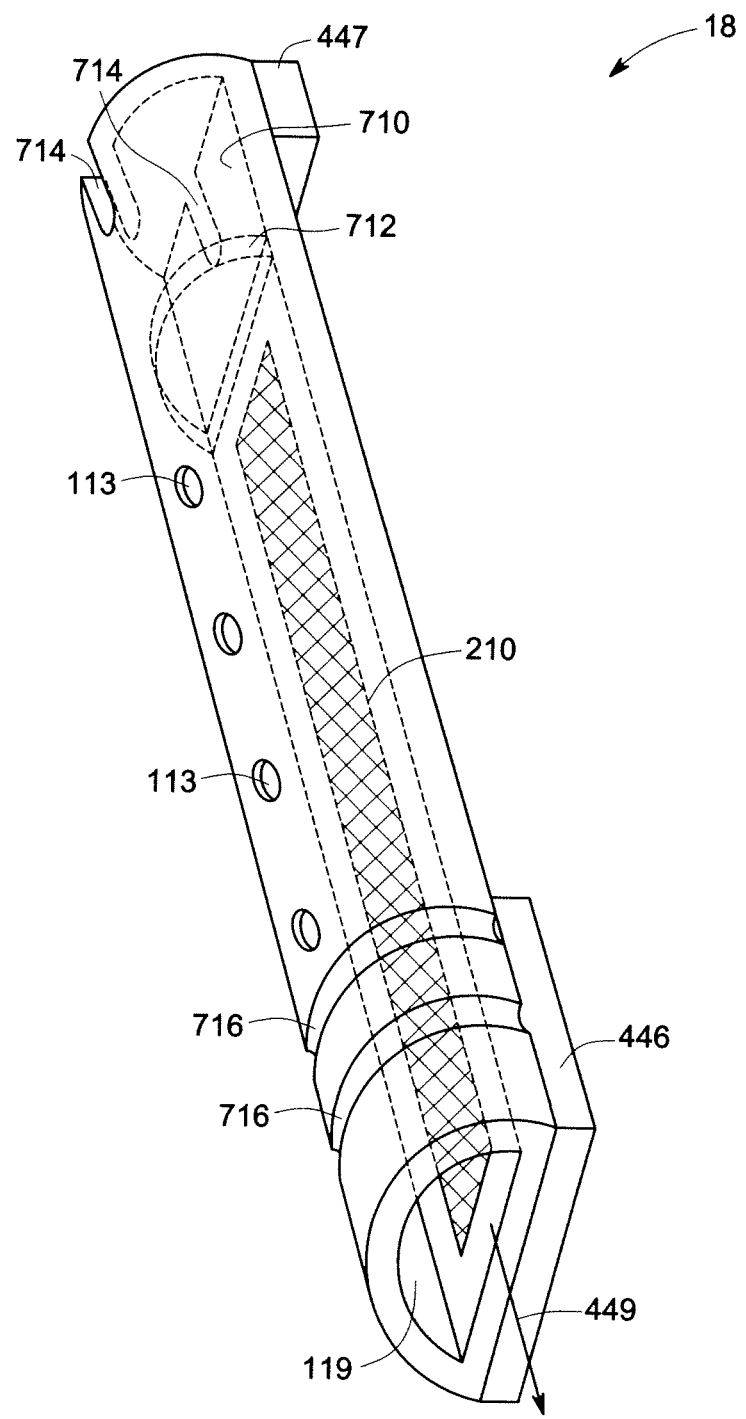
FIG. 7 illustrates a porous exhaust conduit in accordance with an embodiment of the present invention.

Referring to FIG. 7, the figure represents a porous exhaust conduit 18 in accordance with one embodiment of the present invention. Porous exhaust conduit 18 defines (comprises) a channel 119 which is blocked at one end by channel blocking element 712. The porous exhaust conduit also defines (comprises) a feed control cavity 710, feed control baffles 714, spacer elements 446 and 447, openings in permeate exhaust conduit 113, and grooves 716 adapted for securing o-rings. In one embodiment, two porous exhaust conduits 18 provide a central core element 440 which defines a cavity 450 into which may be disposed a first portion of a membrane stack assembly 120. The porous exhaust conduit 18 comprises a removable wall member 210 configured to form a substantial portion of the porous exhaust conduit wall and is separable from the porous exhaust conduit. The removable wall member 210 may be a rectangular wall section defining the cavity configured to accommodate the first portion of the membrane stack assembly 120. In one embodiment, porous exhaust conduits 18 are joined such that the spacer elements 446 and 447 of a first porous exhaust conduit 18 are aligned with the spacer elements 446 and 447 of a second porous exhaust conduit 18. The second portion of the membrane stack assembly 120 is wound around the central core element comprising porous exhaust conduits 18. In one embodiment, that portion of the porous exhaust conduit 18 adapted for contact with the permeate carrier layer or the feed carrier layer is slightly longer than the section of the porous exhaust conduit comprising openings 113. The separator assembly 300 comprising a central core element comprising two porous exhaust conduits 18 may be inserted into a pressurizable housing 405 (FIG. 6) such that the feed control cavities 710 are closest to feed inlet 410. During operation, a feed solution may be introduced through feed inlet 410 into feed control cavities 710. As the feed control cavities become filled, excess feed emerges from the feed control baffles 714 and contacts the feed surface of the separator assembly. One of the purposes of the feed control cavities 710 is to prevent uncontrolled contact between the feed solution and the feed surface, particularly at start up. Grooves 716 adapted for securing o-rings may serve to join the porous exhaust conduits at one end and also to secure the coupling between the separator assembly 300 and coupling member 436 (See FIG. 4a).

Figure 8:
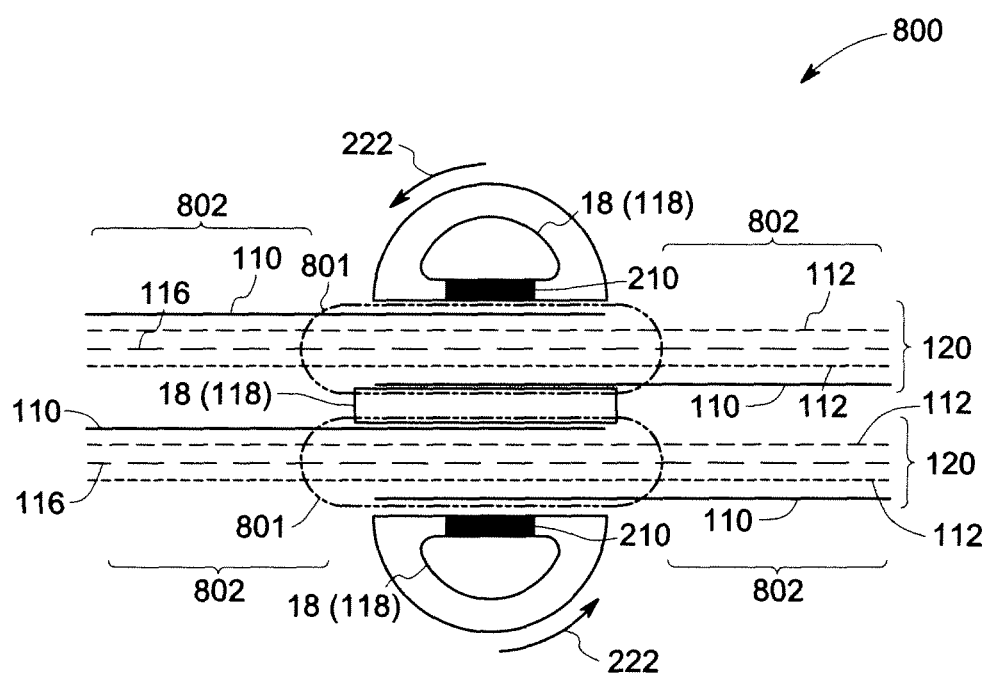
FIG. 8 illustrates membrane stack assemblies disposed within a central core element provided by the present invention.

Referring to FIG. 8, the FIG. 800 represents a cross-section view at midpoint of pair of membrane stack assemblies 120 disposed within a pair of cavities defined by central core element 440 provided by the present invention, the central core element comprising three porous exhaust conduits 18. As shown in FIG. 8 each of the porous exhaust conduits is a permeate exhaust conduit 118. As shown, the membrane stack assemblies 120 comprise a first portion 801 and a second portion 802. A separator assembly is provided by rotating the central core element in direction 222 to provide a wound structure, and sealing the ends of the membrane stack assemblies.

Figure 9:
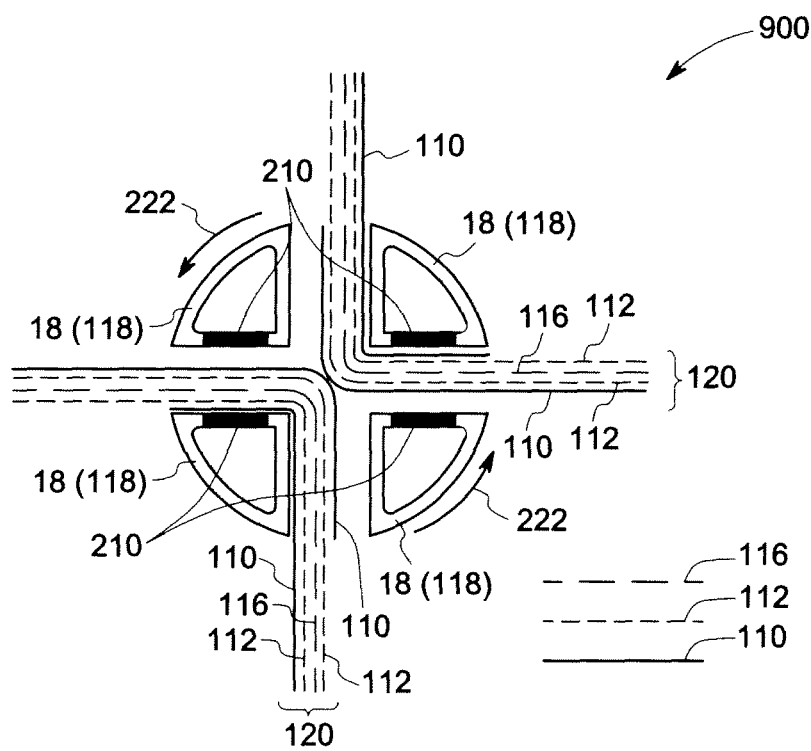
FIG. 9 illustrates membrane stack assemblies disposed within a central core element provided by the present invention.

Referring to FIG. 9, the FIG. 900 represents a cross-section view at midpoint of pair of membrane stack assemblies 120 disposed within cavities defined by central core element 440 provided by the present invention comprising four porous exhaust conduits 18. The porous exhaust conduit 18 includes the removable wall member 210 forming a substantial portion of the porous exhaust conduit wall. As shown in FIG. 9 each of the porous exhaust conduits is a permeate exhaust conduit 118. A separator assembly is provided by rotating the central core element in direction 222 to provide a wound structure, and sealing the ends of the membrane stack assemblies and curing the edge sealant used on the edges and ends of the membrane stack assembly.

Figure 10:
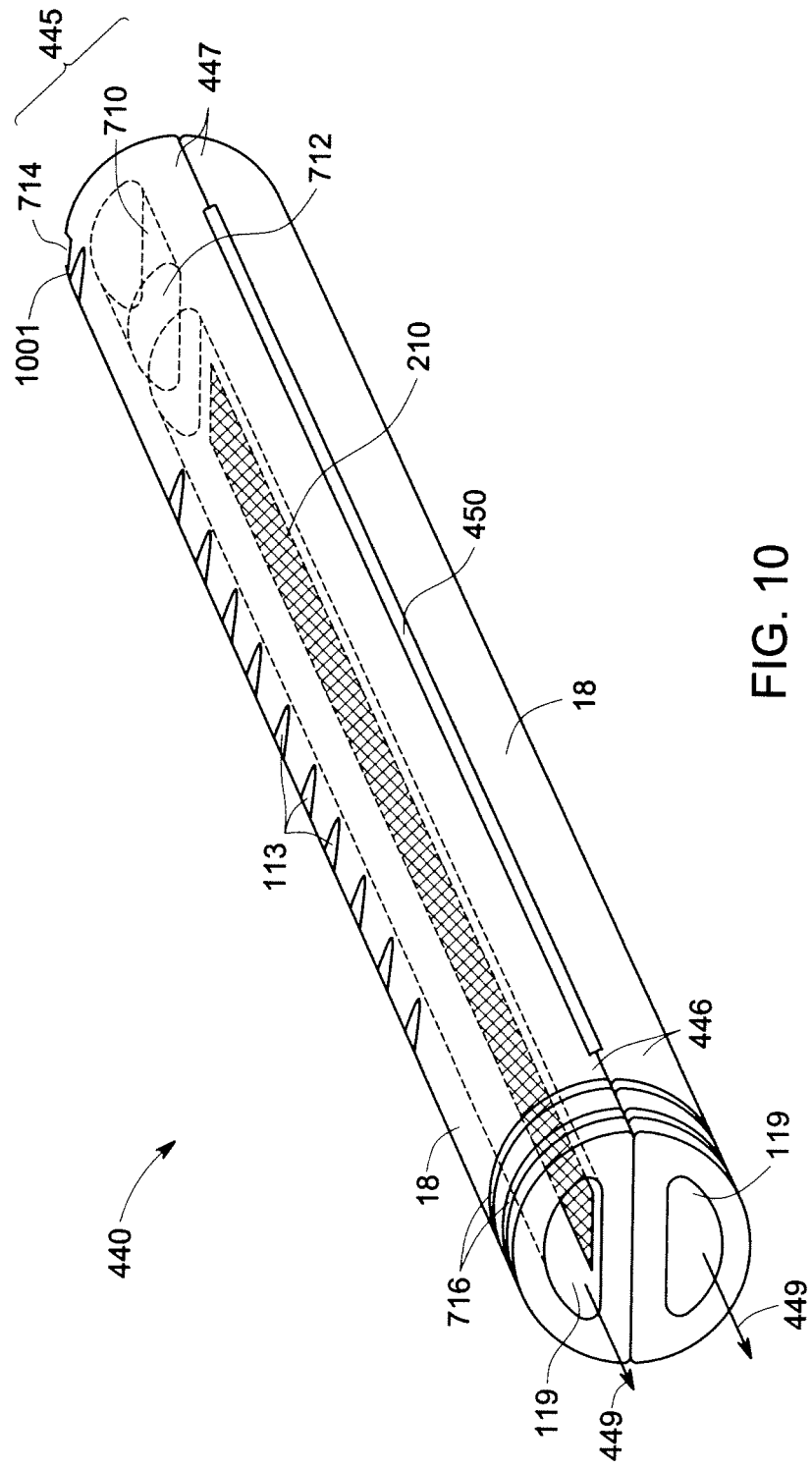
FIG. 10 illustrates a central core element in accordance with an embodiment of the present invention.

Referring to FIG. 10, the FIG. 440 represents a three dimensional view of a central core element of the present invention. Central core element 440 comprises two identical porous exhaust conduits 18 and defines a cavity 450 which may accommodate a first portion of a membrane stack assembly 120. The component porous exhaust conduits 18 of central core element 440 are essentially the same as that illustrated in FIG. 7 with the exception that the porous exhaust conduits 18 illustrated in FIG. 10 comprise a feed control hole 1001 adjacent to feed control baffle 714. Central core element 440 comprises a blocked end 445 and an open end from which, during operation, permeate or concentrate emerges in direction 449. In one embodiment, the term "blocked end" is used to indicate that each of the porous exhaust conduit exhaust channels 119 is blocked by a blocking element 712 such that fluid entering the exhaust channel can exit the porous exhaust conduit only at the end opposite the blocked end. In alternate embodiments the terms "blocked end" or closed end" refer to a closed end 445 of a porous exhaust conduit which does not comprise, for example, a feed control cavity 710. In the embodiment shown in FIG. 10, however, each of the porous exhaust conduits comprises a feed control cavity 710. Moreover, when the central core element 440 shown in FIG. 10 is used in a separator assembly 300, the permeate carrier layers 110 may be disposed around any porous exhaust conduit 18 serving as a permeate exhaust conduit 118 such that no permeate enters the feed control cavity 710.

Figure 11A:
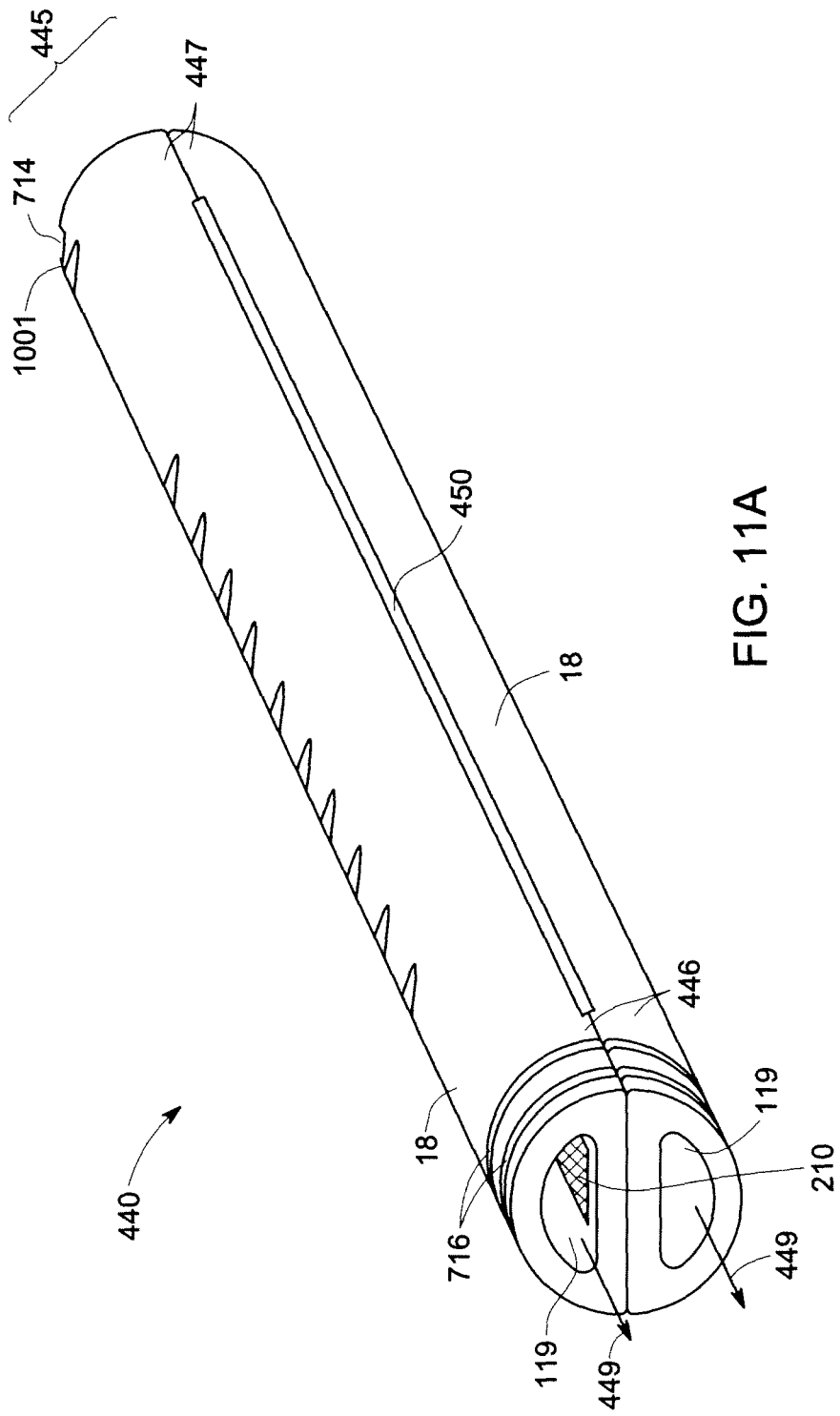

Referring to FIG. 11A, the figure represents a three dimensional solid view of a central core element 440 of the present invention. The central core element is identical to that illustrated in FIG. 10. FIG. 11B represents a side-on view of the central core element of FIG. 11A. FIG. 11C provides an expanded view of the "open end" of the central core element of FIG. 11A.

Figure 12A:
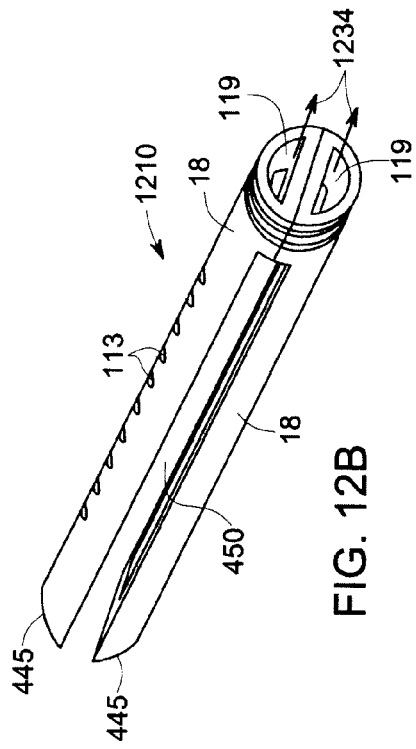
FIG. 12A, FIG. 12B, FIG. 12C and FIG. 12D illustrate a central core element in accordance with an embodiment of the present invention.
Figure 12B:
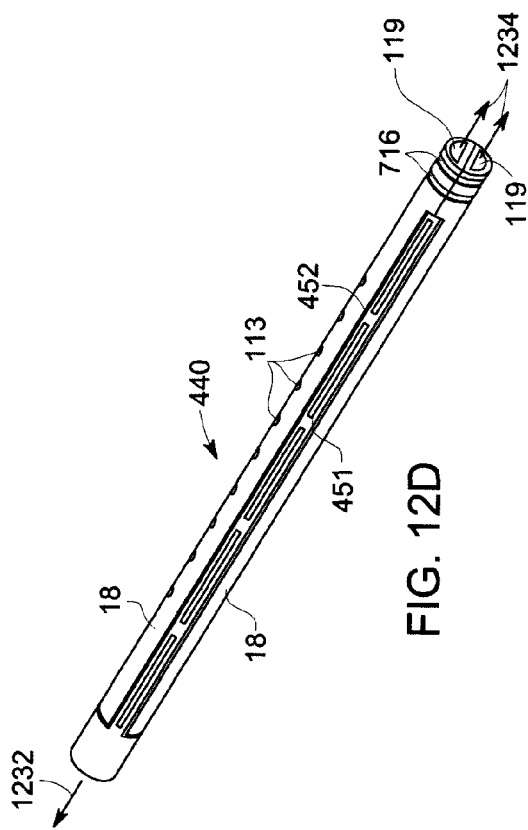
Figure 12C:
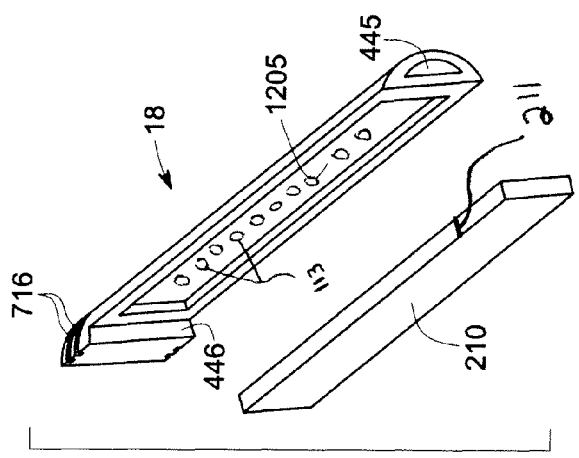
Figure 12D:
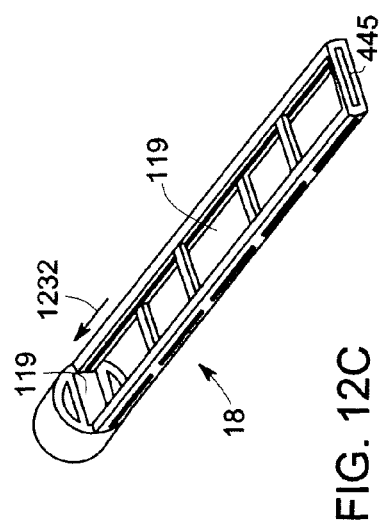

Referring to FIG. 12D, the figure represents a central core element 440 of the present invention which may be employed in separator assemblies. Central core element 440 comprises three porous exhaust conduits 18; two porous exhaust conduits 18 having the structure shown in FIG. 12 A, and a third porous exhaust conduit having the structure shown in FIG. 12C. The central core element 440 of the example presented by FIG. 12D may be used to prepare the separator assemblies as disclosed herein. For example, FIG. 8 shows the central core element 440 of FIG. 12D wherein two membrane stack assemblies 120 are disposed within the cavities defined by the central core element. Two of the porous exhaust conduits 18 shown in FIG. 12A are modified half cylinders comprising an exhaust channel 119 (not visible in FIG. 12A), openings 113 (not shown) communicating with permeate exhaust channel 119, spacer element 446, and grooves 716 adapted for securing an o-ring. The channel 119 runs the length of porous exhaust conduit 18 which in this example is closed at end 445. Two porous exhaust conduits 18 are joined to form partial structure 1210 (FIG. 12B) in which openings 113 and exhaust channels 119 are visible. The porous exhaust conduit includes the removable wall member 210 forming a substantial portion of the porous exhaust conduit wall. Openings 113 allow permeate or concentrate to flow from a permeate or concentrate carrier layer into the exhaust channels 119. Partial structure 1210 further defines a cavity 450 which accommodates both the third porous exhaust conduit 18 (FIG. 12C) and two membrane stack assemblies 120 (for example the membrane stack assemblies configured as shown in FIG. 8). The third porous exhaust conduit 18 FIG. 12C may be inserted into cavity 450 of intermediate structure 1210 to form central core element 440 as shown in FIG. 12D. The third porous exhaust conduit 18 (FIG. 12C) comprises an exhaust channel 119. Flow of permeate or concentrate through exhaust channel 119 of the third porous exhaust conduit 18 (FIG. 12C) occurs in direction 1232 (See FIG. 12C and FIG. 12D). In the embodiment illustrated in FIG. 12A, FIG. 12B, FIG. 12C and FIG. 12D, the closed ends 445 of the first and second porous exhaust conduits 18 (FIG. 12B) prevent permeate or concentrate from exiting the third porous exhaust conduit except by means of the central passage of exhaust channel 119 (FIG. 12C). As noted, the first and second porous exhaust conduits 18 (FIG. 12 A, FIG. 12B and FIG. 12 D) are blocked at end 445 and flow of permeate or concentrate through the exhaust channels 119 defined by the first and second porous exhaust conduits is restricted to direction 1234 (FIG. 12 B and FIG. 12D).

Figure 13A:
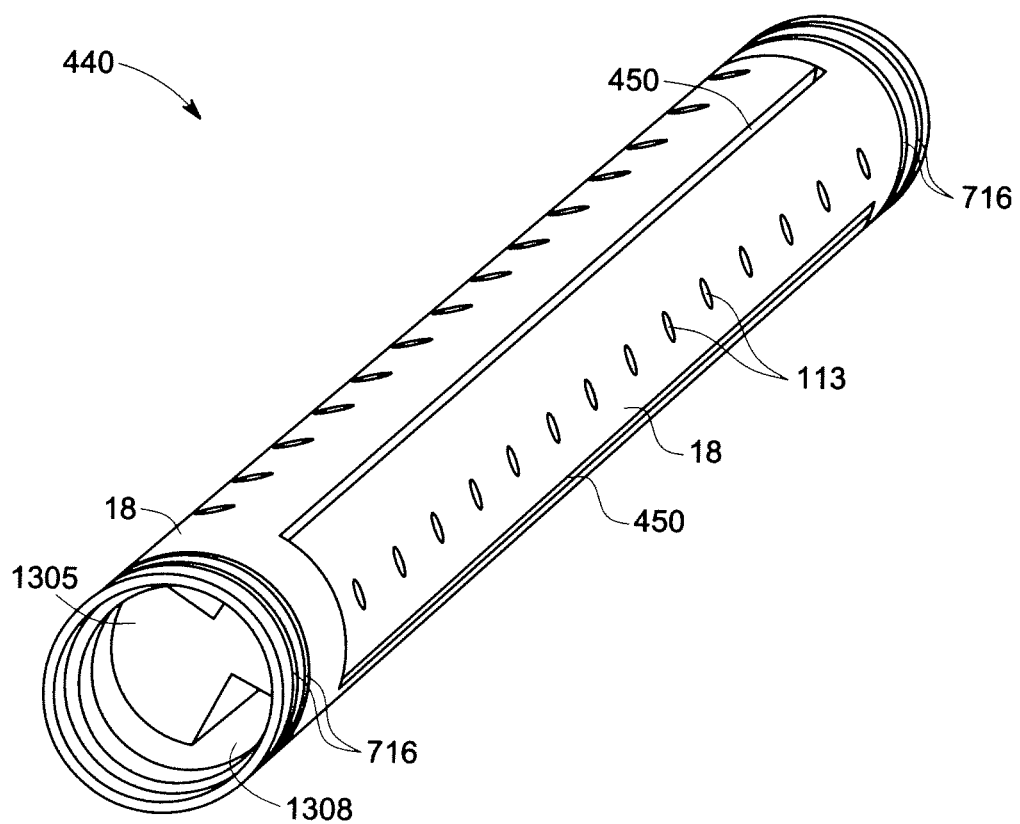
FIG. 13A, FIG. 13B and FIG. 13C illustrate a central core element in accordance with an embodiment of the present invention.
Figure 13B:
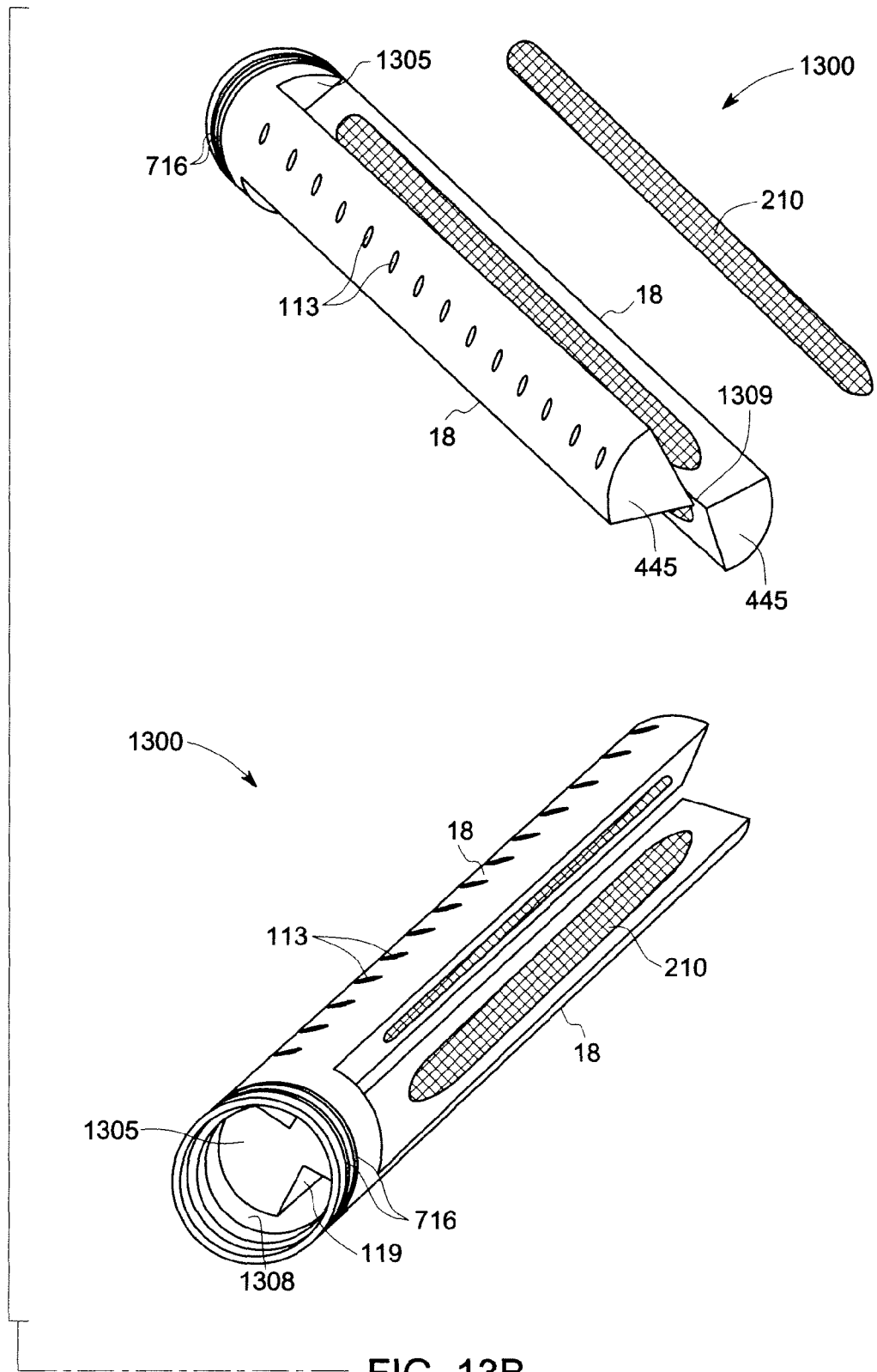
Figure 13C:
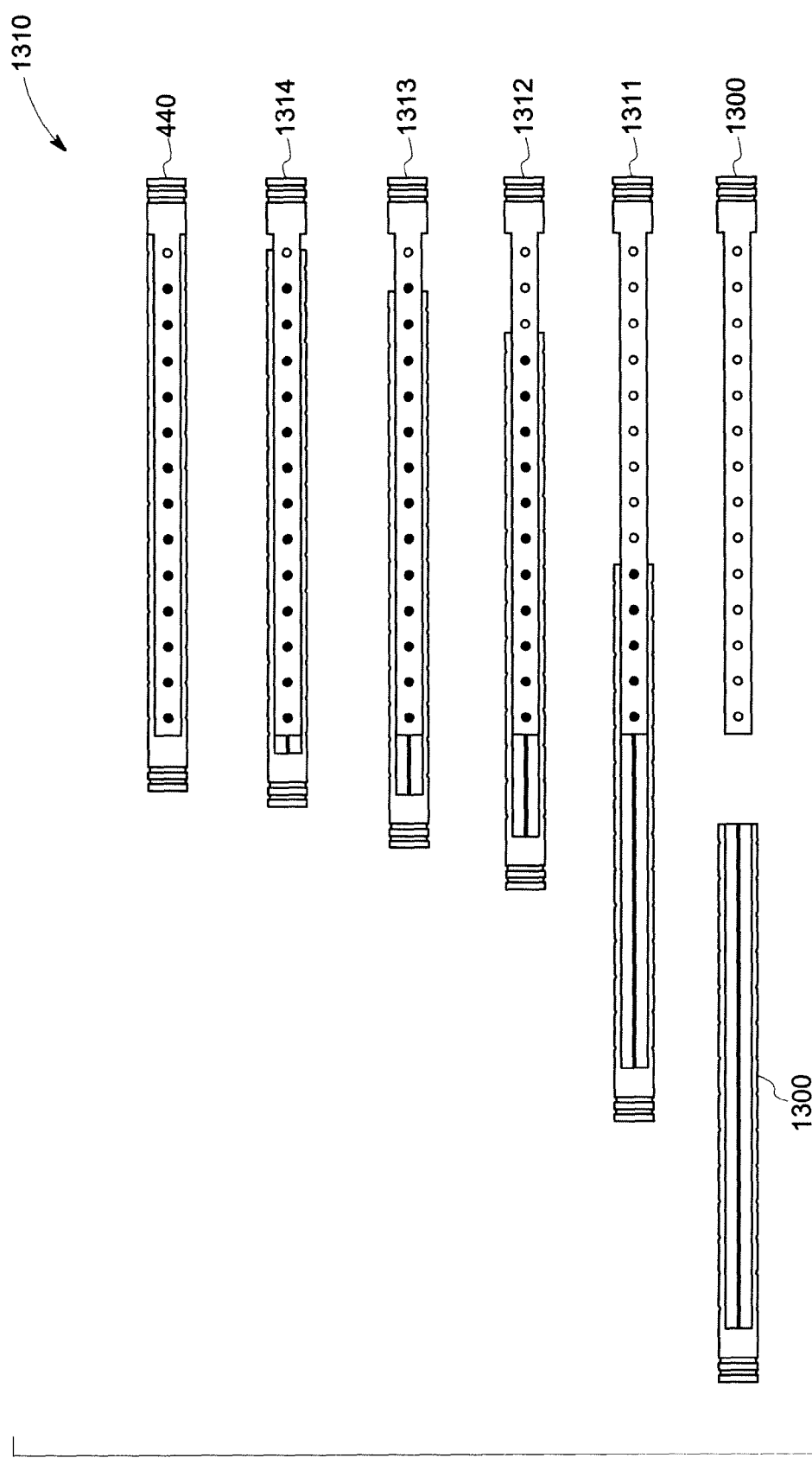

Referring to FIG. 13A, FIG. 13B and FIG. 13C, the FIG. 13A represents a central core element 440 of the present invention which may be employed in separator assemblies. Central core element 440 comprises four porous exhaust conduits 18 configured such that during operation of a separator assembly comprising the central core element, flow through the exhaust channels of two of the porous exhaust conduits is in one direction while flow the exhaust channels of the remaining two porous exhaust conduits is in the opposite direction. The central core element 440 illustrated in FIG. 13A comprises two identical central core element components 1300 (FIG. 13B) each comprising two porous exhaust conduits 18. In the depicted embodiment the removable wall member 210 is an oval shaped unit that forms a substantial portion of the porous exhaust conduit wall. The term "central core element component" is used interchangeably herein with the term "core element component". Central core element components 1300 are illustrated from two viewpoints in FIG. 13B. In a first viewpoint, central core element component 1300 is seen from closed ends 445 of the two porous exhaust conduits 18. The porous exhaust conduits 18 comprising central core element component 1300 are "quarter cylinder" in shape and define openings 113 and exhaust channels 119. The exhaust channels 119 share a common exit cavity 1308 defined by blocking member 1305 and the inner walls of the core element component in the area of the exit cavity. Other features of the central core element component 1300 illustrated in FIG. 13B include grooves 716 adapted for securing an o-ring. Unlike embodiments wherein an o-ring is indicated as securing one central core element component to another, in the embodiment featured in FIG. 13 the o-rings suggested by the presence of grooves 716 are primarily intended to secure the central core element 440 to another component of an apparatus comprising a separator assembly 300 comprising central core element 440, for example the coupling member 446 of a pressurizable housing of a reverse osmosis apparatus. In one embodiment, the gap 1309 between the porous exhaust conduits 18 of a central core element component 1300 is slightly narrower at the closed end 445 than the open end of the central core element component. Under such circumstances, the porous exhaust conduits 18 of the central core element component 1300 are slightly biased toward one another. When two such central core element components 1300 are coupled together to form a central core element 440, this slight bias of the porous exhaust conduits acts to secure the two central core element components to each other without the need for additional securing means such as o-rings.

FIG. 13C illustrates a method 1310 of making the central core element 440 illustrated in FIG. 13A. First, a pair of identical central core element components 1300 is provided. In a first method step, 1311, the closed ends of the central core element components 1300 are engaged. In second third and fourth method steps (1312-1314), the central core element components 1300 are progressively engaged to afford the central core element 440 in which the central core element components are fully engaged.

The central core element 440 illustrated in FIG. 13A exemplifies an embodiment of the present invention wherein the porous exhaust conduits 18 define one or more cavities 450 between themselves which are configured to accommodate a first portion of a membrane stack assembly. For example, the four cavities 450 defined by the four porous exhaust conduits of the central core element 440 shown in FIG. 13A may be configured to accommodate two separate membrane stack assemblies as shown in FIG. 9 wherein each membrane stack assembly comprises two permeate carrier layers 110, two membrane layers 112 and a single feed carrier layer 116. In the embodiment shown in FIG. 13A, gap 1309 (Shown in FIG. 13B) between the porous exhaust conduits 18 of an individual core element component 1300, must accommodate a portion of two membrane stack assemblies and in the embodiment shown in FIG. 9 this includes a total of 10 membrane stack assembly layers. In the embodiment shown in FIG. 13A, the cavities 450 and gap 1309 (FIG. 13B) are defined by the relative positions of the first and second sections of the core element components; the second section comprising the porous exhaust conduits and the first section to which the porous exhaust conduits are attached defining the common exit cavity. As noted, the exhaust channels 119 defined by the porous exhaust conduits 18 are in fluid communication the common exhaust cavity 1308. In one embodiment, a first pair of cavities 450 and a first portion of gap 1309 may accommodate a first portion of a membrane stack assembly 120 by threading one end of the membrane stack assembly into a first cavity 450 of the pair, through gap 1309 and through the second cavity 450 of the pair. In this embodiment the first portion of the membrane stack assembly is accommodated by the pair of cavities 450 and a first portion of gap 1309. In order to complete the assembly shown in FIG. 9, a second membrane stack assembly is threaded through a second pair of cavities 450 and a second portion of gap 1309. A completed separator assembly may be prepared by winding and sealing the assembly illustrated in FIG. 9.

It should be noted that the foregoing discussion illustrates an inventive feature of one or more embodiments of the present invention. Namely, that the central core element 440 may be comprised of core element components (e.g. 1300) each of which is a single piece (a unitary whole) comprising a first section defining an exit cavity and a second section defining one or more porous exhaust conduits. The first section defining the exit cavity also fixes the relative positions in space of the porous exhaust conduits such that in the assembled central core element, the porous exhaust conduits independently define one or more cavities between themselves which may accommodate a first portion of a membrane stack assembly. This cavity, configured to accommodate a first portion of a membrane stack assembly, is defined independently of any component which is not part of the central core element itself. Thus, the dimensions of the cavity are not determined by the dimensions of the membrane stack assembly, nor are the dimensions of the cavity determined by a transient relationship of the porous exhaust conduits to a fixed reference such as a holding jig. In addition, the fact that the central core element 440 may be comprised of core element components each of which is a single piece provides a number of advantages over multi-piece core element components; in particular ease of manufacture, inventorying and handling. In one embodiment, for example that shown in FIG. 13A, the central core element 440 is comprised of identical, single piece core element components 1300.

In one aspect, the central core element 440 illustrated in FIG. 13A can be described as comprising two identical core element components 1300, a first core element component and its complement core element component, each of which comprises two porous exhaust conduits 18. Two core element components 1300, each of which is a single piece, may be joined together as illustrated in FIG. 13C to form central core element 440 (FIG. 13A). The core element components 1300 are joined together by friction couplings, the friction couplings being constituted (as described herein above) by a narrowing of gap 1309 between porous exhaust conduits 18 at closed end 445 relative to the opposite end of the gap (i.e. the gap terminus at blocking element 1305 of the first section of the core element component). This narrowing of gap 1309 may be accomplished by designing the core element component 1300 such that the porous exhaust conduits 18 are slightly biased towards each other in the region of the closed ends 445 of the porous exhaust conduits. This slight biasing of the porous exhaust conduits acts to secure (join) the two core element components 1300 to each other in the central core element 440 by means of friction between the first core element component and its complement core element component in the regions of the closed ends of the porous exhaust conduits adjacent to blocking members 1305 in the assembled central core element. Thus, each core element component comprises a friction coupling constituted by the end portion of porous exhaust conduits 18 in the region in which gap 1309 is at a minimum. When a first core element component 1300 is joined to its complement core element component 1300 to form the central core element 440, a pair of friction joints is created; the friction joints being constituted by the friction coupling of the first core element component in contact with the porous exhaust conduits of its core element component complement, and the friction coupling of the complement core element component in contact with the porous exhaust conduits of the first core element component.

Figure 14:
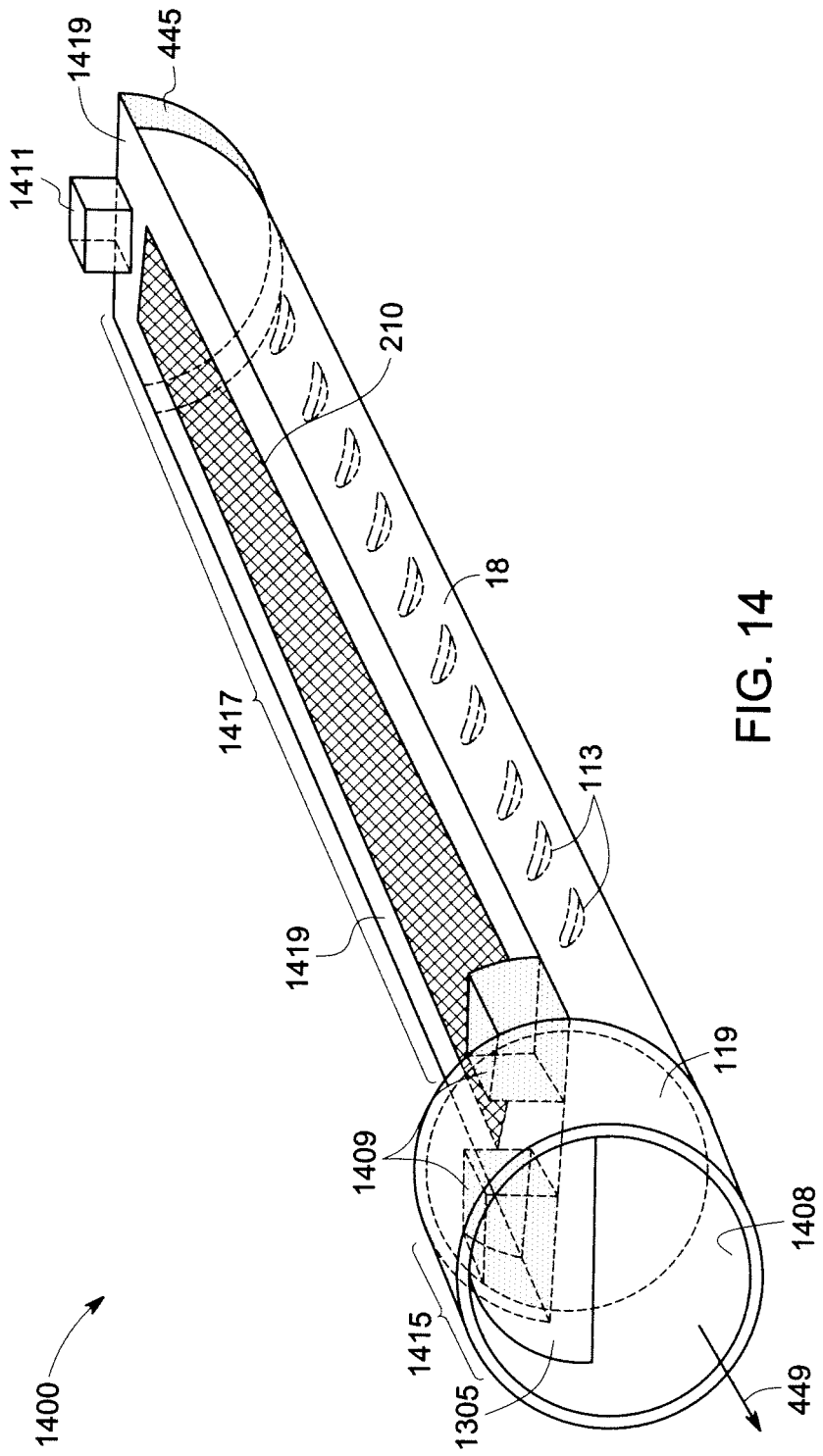
FIG. 14 illustrates a core element component in accordance with an embodiment of the invention.

Referring to FIG. 14, the figure represents a core element component 1400 which may be used to form a central core element 440 provided by the present invention. The core element component comprises a first section 1415 defining an exit cavity 1408 and a second section 1417 comprising a porous exhaust conduit 18 defining a flow channel 119 in fluid communication with exit cavity 1408. The porous exhaust conduit 18 is closed at end 445. In the embodiment shown, the core element component 1400 comprises two friction couplings; a first friction coupling 1409 configured as an open mortise coupling, and a second friction coupling 1411 configured as a tenon coupling. In the embodiment shown, first section 1415 comprises a blocking member 1305 designed to prevent entry of fluid into exit cavity 1408 except via exhaust channel 119. Arrow 449 indicates the direction of fluid flow during operation of a separator assembly comprising a central core element 440 comprising core element component 1400.

Figure 15:
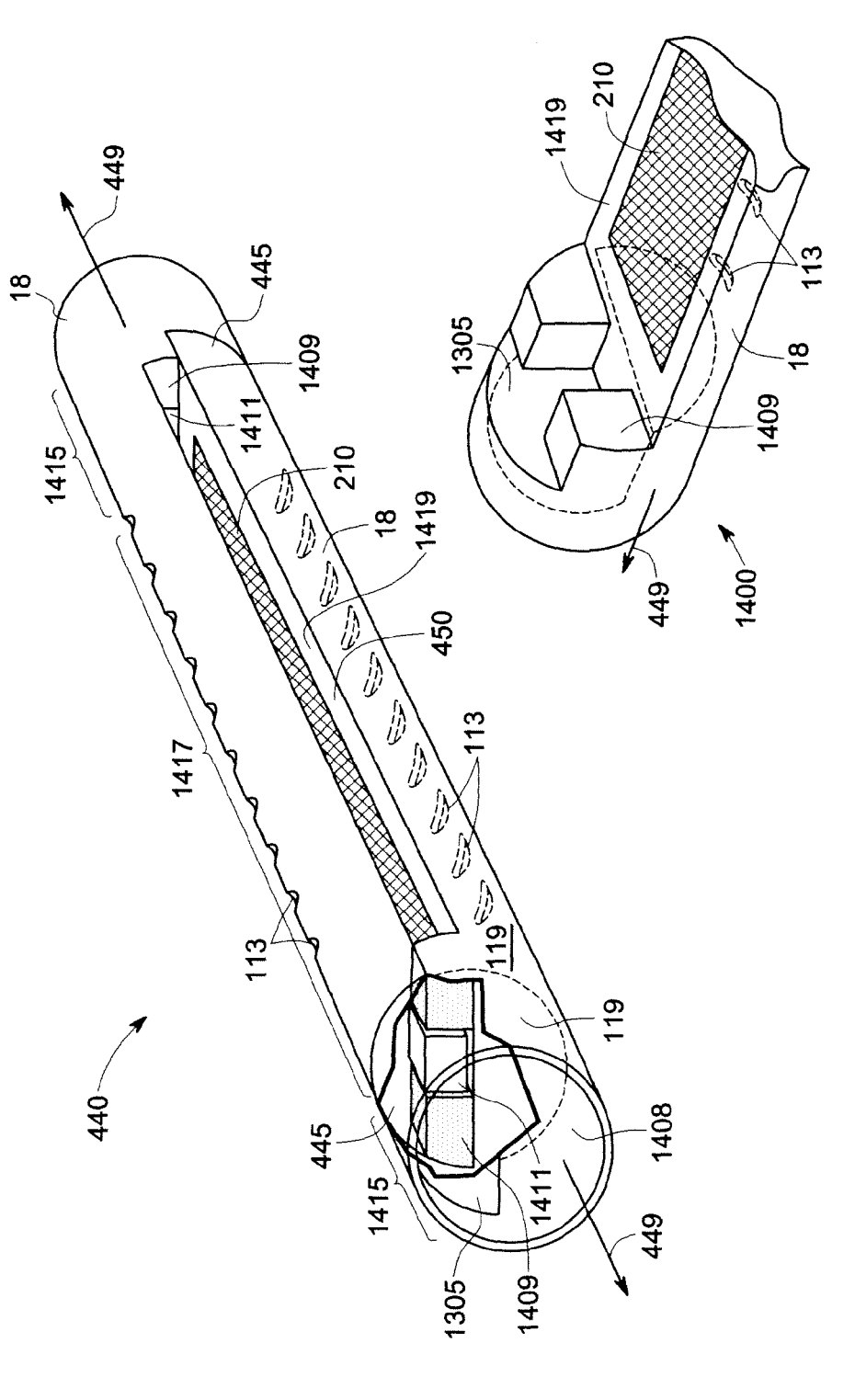
FIG. 15 illustrates a central core element in accordance with an embodiment of the invention.

Referring to FIG. 15, the figure represents a partial cutaway view of a central core element 440 comprising two identical core element components 1400. In addition the figure shows in detail a portion of an open mortise first friction coupling 1409. In the embodiment shown, the central core element 440 comprises two identical core element components 1400 joined together via friction joints comprised of open mortise friction couplings and tenon couplings inserted therein. When joined, together, the core element components 1400 form a central core element 440 which defines a cavity 450 between the porous exhaust conduits 18, the cavity 450 having dimensions suitable to accommodate a first portion of a membrane stack assembly, for example the membrane stack assembly 120 shown in FIG. 2A which comprises a pair of permeate carrier layers 110, a pair of membrane layers 112 and a single feed carrier layer 116. This dimensional suitability of the cavity 450 to accommodate a first portion of a membrane stack assembly is at times referred to herein as being "configured to accommodate a first portion of a membrane stack assembly". The core element components can be designed to accommodate a first portion of any particular membrane stack assembly having any dimensions (e.g. a particular stack height and stack width) or other properties (e.g. stack compressibility, stack swelling properties, etc.) which may relate to the choice of cavity dimensions. In one embodiment, the height and width of the first and second friction couplings 1409 and 1411 may be varied to achieve a particular sized cavity 450. In the embodiment shown, a direction of fluid flow 449 through one of the two exhaust channels 119 defined by the porous exhaust conduits 18 and through the exit cavity 1408 during operation of a separator assembly comprising the central core element 440 is also shown. FIG. 15 shows the porous exhaust conduit 18 comprising a removable wall member 210 configured to form a substantial portion of a porous exhaust conduit wall (1419). The removable wall member 210 is a rectangular wall section defining at least a portion of the cavity 450 configured to accommodate a first portion of the membrane stack assembly 120. (Shown in FIGS. 16, 17, 18, and 19)

Figure 16:
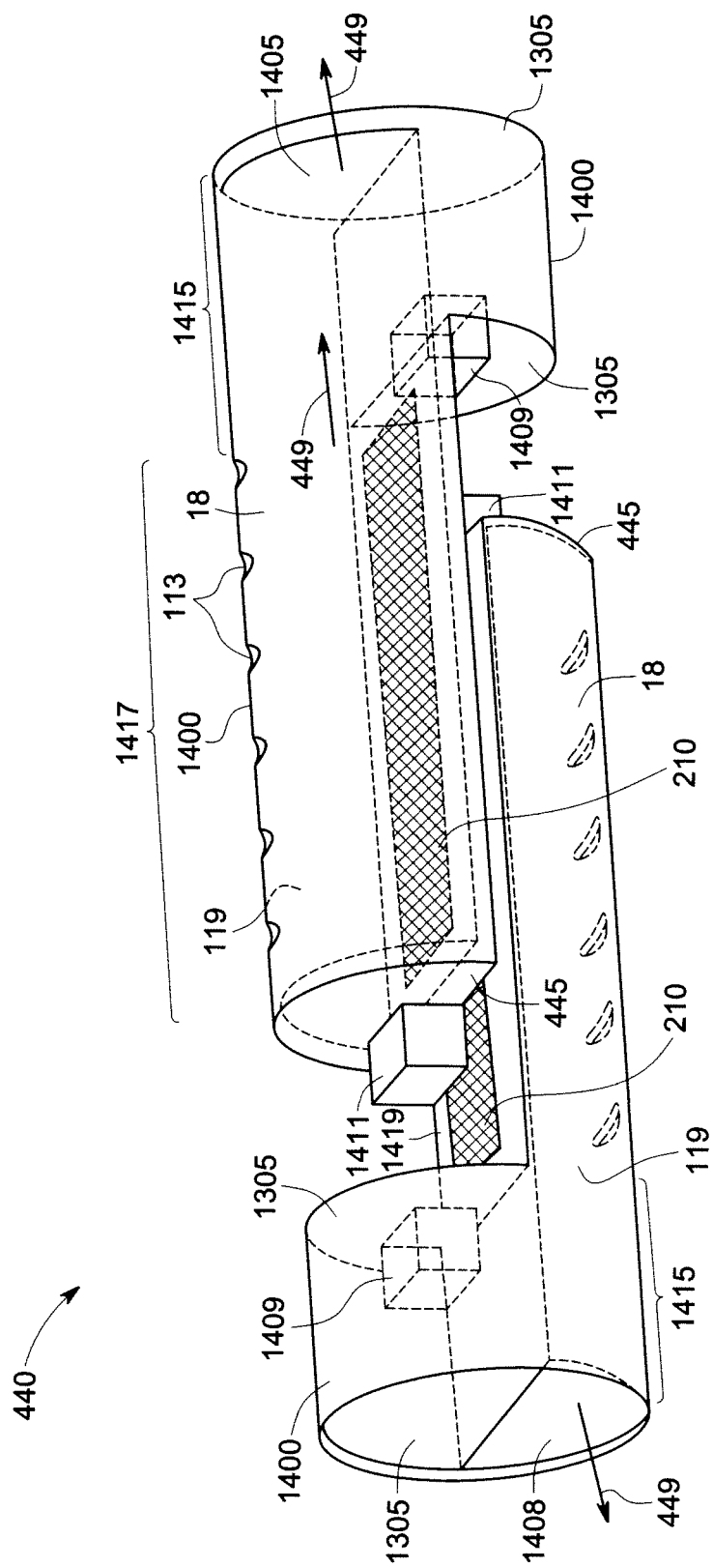
FIG. 16 illustrates a central core element in accordance with an embodiment of the invention.

Referring to FIG. 16, the figure represents an exploded view of a central core element 440 comprising two identical core element components 1400 each of which comprises a pair of friction couplings, a first closed mortise friction coupling 1409 defined by blocking member 1305 and a second tenon friction coupling 1411 in contact with closed end 445 of porous exhaust conduit 18.

Referring to FIG. 17, the figure represents a solid three dimensional view of a core element component 1400 provided by the present invention comprising a first friction coupling 1409 which is the groove-like structure shown, and a second friction coupling 1411 which is a tongue-like structure. When two such core element components 1400 are engaged "head to tail" (See FIG. 20) the friction couplings 1409 and 1411 form a pair of tongue and groove friction joints. In the embodiment of core element component 1400 shown, a wall 1419 comprises part of the porous exhaust conduit 18. When two such core element components 1400 are engaged head to tail walls 1419 and end surfaces 1430 define a cavity 450 configured to accommodate a first portion of a membrane stack assembly. In the embodiment shown, the core element component 1400 comprises a first section 1415 and a second section 1417. First section 1415 defines the first friction coupling 1409 and exit cavity 1408 which is in fluid communication with the interior of the porous exhaust conduit 18. During operation of a separator assembly comprising a central core element 440 comprising core element component 1400, flow through the exit cavity 1408 and porous exhaust conduit 18 is in a direction indicated by arrow 449. Although the core element component 1400 includes grooves 716 adapted for securing a pair of o-rings, such o-rings are not required to secure a pair of core element components 1400 together to form a central core element 440. As noted herein, such grooves 716 are primarily intended to secure the central core element 440 to another component of an apparatus, for example the coupling member 446 of a pressurizable housing of a reverse osmosis apparatus.

Referring to FIG. 18, the figure represents an opposite side solid three dimensional view of the core element component 1400 shown in FIG. 17 and shows an outer surface of the porous exhaust conduit 18 which features openings 113 allowing fluid communication between the outer surface of the porous exhaust conduit and the exhaust channel 119 defined by the porous exhaust conduit which is in fluid communication with exit cavity 1408. In the view shown in FIG. 18, only the second friction coupling 1411 is visible.

Referring to FIG. 19, the figure represents complementary portions of two identical core element components 1400, having a head end 1420 and a tail end 1422. When engaged head to tail, second friction coupling 1411 engages with first friction coupling 1409 to form one of a pair of friction joints 1424 present in the resultant central core element 440 shown in FIG. 20. In the embodiment shown in FIG. 19, first friction coupling 1409 is configured as a groove in the outer surface of first section 1415 into which section friction coupling 1411 may be inserted to form a friction joint, the outer surface of which joint may be flush with the outer surface of first section 1415. In the embodiment shown, first friction coupling 1409 is at least partially defined by groove-defining end surfaces 1430.

In the embodiment shown in FIG. 20, each of the core element components 1400 comprises a pair of friction couplings (a first groove coupling 1409 and a second tongue coupling 1411) engaged as friction joints 1424 in central core element 440. The central core element defines a cavity

450 which traverses the central core element around a center line (not shown), said cavity extending the length of the porous exhaust conduits 18. The cavity is sized appropriately such that the first portion of a membrane stack assembly fills the entire cavity but in such a manner the first portion of the membrane stack assembly is not subjected to excessive compressive stress within the cavity. Thus, in one embodiment, the fit of the membrane stack assembly within the cavity should be such that the top, bottom and side surfaces of the first portion of the membrane stack assembly are in contact with the interior surfaces of the central core element defining the cavity 450; the groove-defining end surfaces 1430 and walls 1419, but not such that the first portion of the membrane stack assembly is subjected to excessive compressive stress either during assembly of a separator assembly comprising the central core element 440 or during operation of such a separator assembly. Excessive compressive stress is compressive stress that would substantially inhibit flow through or within one or more layers of the membrane stack assembly, or would be such that damage to one or more of the layers would result.

As noted, in one embodiment, the present invention provides a central core element comprising at least two identical core element components each of which is a single unitary whole and comprises a first section defining an outlet cavity and a second section defining a porous exhaust conduit. Each of the core element components comprises at least one friction coupling configured to join the core element components to form a central core element defining a cavity configured to accommodate a first portion of a membrane stack assembly. Various types of friction couplings are known to those of ordinary skill in the art and may be used in the practice of the present invention. Suitable friction couplings include those mentioned herein above, as well as friction couplings constituting snap fittings. Further progress and innovation in the friction coupling arena will be made, and it is the intention of the inventors of this disclosure, that at least some currently unknown friction couplings will be useful in the practice of their invention. As will be appreciated by those of ordinary skill in the art a friction coupling finds use as a component of a friction joint wherein a first friction coupling and its complement friction coupling are engaged and held together by friction forces which must be overcome in order to engage or disengage said couplings.

As noted elsewhere in this disclosure, the central core elements provided by the present invention may have a variety of shapes, including for example a square tubular shape and a cylindrical shape. In one embodiment, the present invention provides a central core element for a separator assembly wherein the central core element is cylindrical in shape.

In one embodiment, the present invention provides a central core element useful in the preparation of a salt separator assembly comprising a central core element comprising at least two permeate exhaust conduits, and not comprising a concentrate exhaust conduit, and comprising a membrane stack assembly comprising at least one feed carrier layer, at least two permeate carrier layers, and at least two salt-rejecting membrane layers, the salt-rejecting membrane layers being disposed between the feed carrier layer and the permeate carrier layers. A first portion of the membrane stack assembly is disposed within a cavity defined by the central core element. A second portion of the membrane stack assembly forms a multilayer membrane assembly disposed around the central core element. The feed carrier layer is not in contact with any of the permeate exhaust conduits and is not in contact with the permeate carrier layer. The permeate carrier layers are each in contact with at least one of the permeate exhaust conduits.

In one embodiment, the salt separator assembly comprising the central core element provided by the present invention comprises a multilayer membrane assembly which is radially disposed about the central core element. The salt separator assembly may comprise a salt-rejecting membrane layer which has a functionalized surface and an unfunctionalized surface. In one embodiment, the salt separator assembly comprises a central core element comprising three or more porous exhaust conduits. In another embodiment, the salt separator assembly comprises three or more permeate carrier layers. In yet another embodiment, the salt separator assembly comprises a plurality of feed carrier layers, and in an alternate embodiment, the salt separator assembly comprises three or more salt-rejecting membrane layers.

In yet another embodiment, the present invention provides a central core element useful in the preparation of a spiral flow reverse osmosis membrane apparatus comprising (a) a pressurizable housing and (b) a separator assembly. The separator assembly comprises a membrane stack assembly comprising at least one feed carrier layer, at least two permeate carrier layers, and at least two membrane layers, the feed carrier layer being disposed between two membrane layers. The feed carrier layer is not in contact with the permeate carrier layer. In one embodiment, the separator assembly comprises a central core element comprising at least two permeate exhaust conduits and which does not comprise a concentrate exhaust conduit. A first portion of the membrane stack assembly is disposed within a cavity defined by the permeate exhaust conduits of central core element. A second portion of the membrane stack assembly forms a multilayer membrane assembly disposed around the central core element. The feed carrier layer is not in contact with a permeate exhaust conduit. The permeate carrier layers are in contact with at least one of the permeate exhaust conduits and are not in contact with the feed carrier layer. The pressurizable housing comprises at least one feed inlet configured to provide feed solution to the feed surface of the separator assembly. The pressurizable housing comprises at least one permeate exhaust outlet coupled to the permeate exhaust conduit, and at least one concentrate exhaust outlet coupled to the concentrate surface of the separator assembly. The pressurizable housing may be made of suitable material or materials. For example, the pressurizable housing may be made of a polymer, stainless steel, or a combination thereof. In one embodiment, the pressurizable housing is made of a transparent plastic material. In another embodiment, the pressurizable housing is made of a transparent inorganic material, for example, glass.

The central core elements provided by the present invention may be made by a variety of methods, for example by injection molding, blow molding, and molding techniques such as clam shell injection molding, over-molding and gas assisted molding, techniques well known to one of ordinary skill in the art. The central core elements provided by the present invention may be made of any suitable material, however, due to a combination of strength and low cost, thermoplastics such as polyethylene may be preferred.

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. A central core element for a reverse osmosis separator assembly comprising:
    a pair of central core element components, each of said central core element components comprising at least one porous exhaust conduit and at least one friction coupling, the friction couplings configured to join said central core element components to form the central core element defining a cavity configured to accommodate a first portion of a membrane stack assembly;
    wherein each of the central core element components comprises a first section defining an exhaust cavity and a second section comprising the at least one porous exhaust conduit,
    wherein each of the porous exhaust conduit comprises a removable wall member configured to form a substantial portion of a porous exhaust conduit wall.

2. The central core element according to claim 1, wherein the removable wall member is a rectangular wall section defining at least a portion of the cavity configured to accommodate the first portion of the membrane stack assembly.

3. The central core element according to claim 1, wherein at least one of the porous exhaust conduits is a porous half-cylinder shaped tube.

4. The central core element according to claim 1, wherein at least one of the porous exhaust conduits is selected from the group consisting of porous half-octagon shaped tubes, porous half-decahedron shaped tubes, and porous half-tetradecahedron shaped tubes.

5. The central core element according to claim 1, wherein all said porous exhaust conduits have identical shapes.

6. The central core element according to claim 1, wherein at least two of said porous exhaust conduits have different shapes.

7. The central core element according to claim 1, comprising at least one of the porous exhaust conduits having a teardrop shape.

8. The central core element according to claim 1 comprising at least three porous exhaust conduits.

9. The central core element according to claim 1 comprising at least four porous exhaust conduits.

10. The central core element according to claim 8 comprising four porous exhaust conduits.

11. The central core element according to claim 1, wherein at least one of said porous exhaust conduit comprises a blocking element.

12. The central core element according to claim 1, wherein the porous exhaust conduits comprise one or more grooves adapted to secure an o-ring.

13. The central core element according to claim 1, wherein the porous exhaust conduits define at least two cavities configured to accommodate a first portion of a membrane stack assembly.

14. The central core element according to claim 1, wherein the central core element components are formed of a thermoplastic.

15. The central core element according to claim 14, wherein the thermoplastic comprises a filler material.

16. A central core element for a reverse osmosis separator assembly comprising:
    a pair of central core element components, each of said central core element components comprising a porous exhaust conduit and two friction couplings, the friction couplings configured to join said central core element components to form the central core element defining a cavity configured to accommodate a first portion of a membrane stack assembly;
    wherein each of the central core element components comprises a first section defining an exhaust cavity and a second section comprising the porous exhaust conduit,
    wherein each of the porous exhaust conduits comprises a removable wall member configured to form a substantial portion of a porous exhaust conduit wall.

17. The central core element according to claim 16, wherein at least one of the friction couplings comprises a tongue and a groove friction coupling.

18. The central core element according to claim 16, wherein at least one of the friction couplings comprises a mortise and a tenon friction coupling.

19. The central core element according to claim 16, wherein at least one of the friction couplings is a snap fitting.

20. A central core element for a reverse osmosis separator assembly comprising:
    a pair of central core element components, each of said central core element components comprised essentially of polyethylene, each of the central core element components comprising a porous exhaust conduit and two friction couplings, the friction couplings configured to join said central core element components to form the central core element defining a cavity configured to accommodate a first portion of a membrane stack assembly;
    wherein each of the central core element components comprises a first section defining an exhaust cavity and a second section comprising the porous exhaust conduit,
    wherein each of the porous exhaust conduits comprises a removable wall member configured to form a substantial portion of a porous exhaust conduit wall.

* * * * *